(12) United States Patent
Huang et al.

(10) Patent No.: US 11,030,993 B2
(45) Date of Patent: Jun. 8, 2021

(54) ADVERTISEMENT SELECTION BY LINGUISTIC CLASSIFICATION

(71) Applicant: SoundHound, Inc., Santa Clara, CA (US)

(72) Inventors: Jun Huang, Fremont, CA (US); Kiran Garaga Lokeswarappa, Mountain View, CA (US); Joel Gedalius, Baltimore, MD (US); Bernard Mont-Reynaud, Sunnyvale, CA (US)

(73) Assignee: SoundHound, Inc., Santa Clara, CA (US)

( * ) Notice: Subject to any disclaimer, the term of this patent is extended or adjusted under 35 U.S.C. 154(b) by 0 days.

(21) Appl. No.: 16/388,753

(22) Filed: Apr. 18, 2019

(65) Prior Publication Data
US 2019/0244600 A1     Aug. 8, 2019

Related U.S. Application Data

(63) Continuation of application No. 15/385,493, filed on Dec. 20, 2016, now Pat. No. 10,311,858, which is a
(Continued)

(51) Int. Cl.
*G10L 15/00* (2013.01)
*G10L 15/02* (2006.01)
(Continued)

(52) U.S. Cl.
CPC ............ *G10L 15/02* (2013.01); *G06F 40/205* (2020.01); *G06F 40/211* (2020.01); *G06F 40/253* (2020.01); *G06N 20/00* (2019.01); *G06Q 30/0251* (2013.01); *G06Q 30/0276* (2013.01); *G06Q 30/0277* (2013.01);
(Continued)

(58) Field of Classification Search
CPC combination set(s) only.
See application file for complete search history.

(56) References Cited

U.S. PATENT DOCUMENTS 3,919,479 A    11/1975  Moon et al.
4,450,531 A     5/1984  Kenyon et al.
(Continued)

FOREIGN PATENT DOCUMENTS

EP    0944033         9/1999
EP    0944033 A1      9/1999
(Continued)

OTHER PUBLICATIONS

"Do you know the true cost of IVR migration?" Datasheet. Aspect Software Incorporated, Dec. 2012, 4 pgs.
(Continued)

*Primary Examiner* — Vu B Hang
(74) *Attorney, Agent, or Firm* — Haynes Beffel & Wolfeld LLP; Ernest J. Beffel; Andrew L. Dunlap

(57) ABSTRACT

A method is provided for advertisement selection. The method includes recognizing words from user speech over a large number of interactions, computing a number of unique words uttered during the interactions, classifying the user by the number of unique words uttered during the interactions, and selecting an advertisement targeted to the classified users.

14 Claims, 8 Drawing Sheets

Related U.S. Application Data continuation of application No. 14/704,833, filed on May 5, 2015, now Pat. No. 9,564,123.

(60) Provisional application No. 61/992,172, filed on May 12, 2014.

(51) Int. Cl.

| | |
|---|---|
| *H04L 29/08* | (2006.01) |
| *G10L 15/06* | (2013.01) |
| *G06Q 30/02* | (2012.01) |
| *G06F 40/205* | (2020.01) |
| *G06F 40/211* | (2020.01) |
| *G06F 40/253* | (2020.01) |
| *G06N 20/00* | (2019.01) |
| *G10L 15/18* | (2013.01) |
| *G10L 25/90* | (2013.01) |
| *G10L 15/22* | (2006.01) |
| *G10L 25/51* | (2013.01) |
| *G10L 15/26* | (2006.01) |

(52) U.S. Cl.
CPC ........ *G10L 15/063* (2013.01); *G10L 15/1815* (2013.01); *G10L 25/90* (2013.01); *H04L 67/306* (2013.01); *G10L 15/22* (2013.01); *G10L 15/26* (2013.01); *G10L 25/51* (2013.01); *G10L 2015/025* (2013.01)

(56) References Cited

U.S. PATENT DOCUMENTS

| | | |
|---|---|---|
| 4,697,209 A | 9/1987 | Kiewit et al. |
| 4,739,398 A | 4/1988 | Thomas et al. |
| 4,843,562 A | 6/1989 | Kenyon et al. |
| 4,918,730 A | 4/1990 | Schulze |
| 4,928,249 A | 5/1990 | Vermesse |
| 4,959,850 A | 9/1990 | Marui |
| 5,019,899 A | 5/1991 | Boles et al. |
| 5,164,915 A | 11/1992 | Blyth |
| 5,436,653 A | 7/1995 | Ellis et al. |
| 5,437,050 A | 7/1995 | Lamb et al. |
| 5,511,000 A | 4/1996 | Kaloi et al. |
| 5,542,138 A | 8/1996 | Williams et al. |
| 5,577,249 A | 11/1996 | Califano |
| 5,581,658 A | 12/1996 | O'Hagan et al. |
| 5,664,270 A | 9/1997 | Bell et al. |
| 5,687,279 A | 11/1997 | Matthews |
| 5,708,477 A | 1/1998 | Forbes et al. |
| 5,862,260 A | 1/1999 | Rhoads |
| 5,874,686 A | 2/1999 | Ghias et al. |
| 5,880,386 A | 3/1999 | Wachi et al. |
| 5,907,815 A | 5/1999 | Grimm et al. |
| 5,918,223 A | 6/1999 | Blum et al. |
| 5,956,683 A | 9/1999 | Jacobs et al. |
| 5,963,957 A | 10/1999 | Hoffberg |
| 5,969,283 A | 10/1999 | Looney et al. |
| 5,974,409 A | 10/1999 | Sanu et al. |
| 5,991,737 A | 11/1999 | Chen |
| 6,049,710 A | 4/2000 | Nilsson |
| 6,067,516 A | 5/2000 | Levay et al. |
| 6,092,039 A | 7/2000 | Zingher |
| 6,108,626 A | 8/2000 | Cellario et al. |
| 6,121,530 A | 9/2000 | Sonoda |
| 6,122,403 A | 9/2000 | Rhoads |
| 6,182,128 B1 | 1/2001 | Kelkar et al. |
| 6,188,985 B1 | 2/2001 | Thrift et al. |
| 6,201,176 B1 | 3/2001 | Yourlo |
| 6,233,682 B1 | 5/2001 | Fritsch |
| 6,292,767 B1 | 9/2001 | Jackson et al. |
| 6,314,577 B1 | 11/2001 | Pocock |
| 6,345,256 B1 | 2/2002 | Milsted et al. |
| 6,363,349 B1 | 3/2002 | Urs et al. |
| 6,385,434 B1 | 5/2002 | Chuprun et al. |
| 6,405,029 B1 | 6/2002 | Nilsson |
| 6,408,272 B1 | 6/2002 | White et al. |
| 6,434,520 B1 | 8/2002 | Kanevsky et al. |
| 6,453,252 B1 | 9/2002 | Laroche |
| 6,504,089 B1 | 1/2003 | Negishi et al. |
| 6,505,160 B1 | 1/2003 | Levy et al. |
| 6,507,727 B1 | 1/2003 | Henrick |
| 6,510,325 B1 | 1/2003 | Mack, II et al. |
| 6,519,564 B1 | 2/2003 | Hoffberg et al. |
| 6,535,849 B1 | 3/2003 | Pakhomov et al. |
| 6,542,869 B1 | 4/2003 | Foote |
| 6,594,628 B1 | 7/2003 | Jacobs et al. |
| 6,611,607 B1 | 8/2003 | Davis et al. |
| 6,614,914 B1 | 9/2003 | Rhoads et al. |
| 6,629,066 B1 | 9/2003 | Jackson et al. |
| 6,631,346 B1 | 10/2003 | Karaorman et al. |
| 6,633,845 B1 | 10/2003 | Logan et al. |
| 6,633,846 B1 | 10/2003 | Bennett et al. |
| 6,640,306 B1 | 10/2003 | Tone et al. |
| 6,834,308 B1 | 12/2004 | Ikezoye et al. |
| 6,850,288 B2 | 2/2005 | Kurokawa |
| 6,879,950 B1 | 4/2005 | Mackie et al. |
| 6,931,451 B1 | 8/2005 | Logan et al. |
| 6,941,275 B1 | 9/2005 | Swierczek |
| 6,967,275 B2 | 11/2005 | Ozick |
| 6,990,453 B2 | 1/2006 | Wang et al. |
| 6,995,309 B2 | 2/2006 | Samadani et al. |
| 7,017,208 B2 | 3/2006 | Weismiller et al. |
| 7,058,376 B2 | 6/2006 | Logan et al. |
| 7,085,716 B1 | 8/2006 | Even et al. |
| 7,174,293 B2 | 2/2007 | Kenyon et al. |
| 7,190,971 B1 | 3/2007 | Kawamoto |
| 7,206,820 B1 | 4/2007 | Rhoads et al. |
| 7,209,892 B1 | 4/2007 | Galuten et al. |
| 7,233,321 B1 | 6/2007 | Larson et al. |
| 7,257,536 B1 | 8/2007 | Finley et al. |
| 7,266,343 B1 | 9/2007 | Yli-juuti et al. |
| 7,323,629 B2 | 1/2008 | Somani et al. |
| 7,328,153 B2 | 2/2008 | Wells et al. |
| 7,373,209 B2 | 5/2008 | Tagawa et al. |
| 7,379,875 B2 | 5/2008 | Burges et al. |
| 7,444,353 B1 | 10/2008 | Chen et al. |
| 7,516,074 B2 | 4/2009 | Bilobrov |
| 7,562,392 B1 | 7/2009 | Rhoads et al. |
| 7,567,899 B2 | 7/2009 | Bogdanov |
| 7,580,832 B2 | 8/2009 | Allamanche et al. |
| 7,672,916 B2 | 3/2010 | Poliner et al. |
| 7,693,720 B2 | 4/2010 | Kennewick et al. |
| 7,743,092 B2 | 6/2010 | Wood |
| 7,756,874 B2 | 7/2010 | Hoekman et al. |
| 7,783,489 B2 | 8/2010 | Kenyon et al. |
| 7,853,664 B1 | 12/2010 | Wang et al. |
| 7,858,868 B2 | 12/2010 | Kemp et al. |
| 7,881,657 B2 | 2/2011 | Wang et al. |
| 7,899,818 B2 | 3/2011 | Stonehocker et al. |
| 7,904,297 B2 | 3/2011 | Mirkovic et al. |
| 7,908,135 B2 | 3/2011 | Shishido |
| 8,013,230 B2 | 9/2011 | Eggink |
| 8,073,684 B2 | 12/2011 | Sundareson |
| 8,086,171 B2 | 12/2011 | Wang et al. |
| 8,116,746 B2 | 2/2012 | Lu et al. |
| 8,296,179 B1 | 10/2012 | Rennison |
| 8,358,966 B2 | 1/2013 | Zito et al. |
| 8,411,830 B2 * | 4/2013 | Gilbert ............... H04W 4/12 379/93.01 |
| 8,726,312 B1 | 5/2014 | Hewinson |
| 8,762,156 B2 | 6/2014 | Chen |
| 9,414,006 B2 * | 8/2016 | Song ................. H04N 5/44513 |
| 9,564,123 B1 | 2/2017 | Mont-Reynaud et al. |
| 2001/0005823 A1 | 6/2001 | Fischer et al. |
| 2001/0014891 A1 | 8/2001 | Hoffert et al. |
| 2001/0053974 A1 | 12/2001 | Lucke et al. |
| 2002/0023020 A1 | 2/2002 | Kenyon et al. |
| 2002/0042707 A1 | 4/2002 | Zhao et al. |
| 2002/0049037 A1 | 4/2002 | Christensen et al. |
| 2002/0052674 A1 | 5/2002 | Chang et al. |
| 2002/0072982 A1 | 6/2002 | Barton et al. |
| 2002/0083060 A1 | 6/2002 | Wang et al. |
| 2002/0138630 A1 | 9/2002 | Solomon et al. |

(56) References Cited

U.S. PATENT DOCUMENTS

| | | |
|---|---|---|
| 2002/0174431 A1 | 11/2002 | Bowman et al. |
| 2002/0181671 A1 | 12/2002 | Logan |
| 2002/0193895 A1 | 12/2002 | Qian et al. |
| 2002/0198705 A1 | 12/2002 | Burnett |
| 2002/0198713 A1 | 12/2002 | Franz et al. |
| 2002/0198789 A1 | 12/2002 | Waldman |
| 2003/0023437 A1 | 1/2003 | Fung |
| 2003/0050784 A1 | 3/2003 | Hoffberg et al. |
| 2003/0078928 A1 | 4/2003 | Dorosario et al. |
| 2003/0106413 A1 | 6/2003 | Samadani et al. |
| 2003/0192424 A1 | 10/2003 | Koike |
| 2004/0002858 A1 | 1/2004 | Attias et al. |
| 2004/0019497 A1 | 1/2004 | Volk et al. |
| 2004/0167779 A1 | 8/2004 | Lucke et al. |
| 2004/0193420 A1 | 9/2004 | Kennewick et al. |
| 2004/0231498 A1 | 11/2004 | Li et al. |
| 2005/0016360 A1 | 1/2005 | Zhang |
| 2005/0027699 A1 | 2/2005 | Awadallah et al. |
| 2005/0086059 A1 | 4/2005 | Bennett |
| 2005/0254366 A1 | 11/2005 | Amar |
| 2005/0273326 A1 | 12/2005 | Padhi et al. |
| 2006/0059225 A1 | 3/2006 | Stonehocker et al. |
| 2006/0122839 A1 | 6/2006 | Li-Chun Wang et al. |
| 2006/0155694 A1 | 7/2006 | Chowdhury et al. |
| 2006/0169126 A1 | 8/2006 | Ishiwata et al. |
| 2006/0189298 A1 | 8/2006 | Marcelli |
| 2006/0242017 A1 | 10/2006 | Libes et al. |
| 2006/0277052 A1 | 12/2006 | He et al. |
| 2007/0010195 A1 | 1/2007 | Brown et al. |
| 2007/0016404 A1 | 1/2007 | Kim et al. |
| 2007/0055500 A1 | 3/2007 | Bilobrov |
| 2007/0120689 A1 | 5/2007 | Zerhusen et al. |
| 2007/0124134 A1 | 5/2007 | Van Kommer |
| 2007/0168409 A1 | 7/2007 | Cheung |
| 2007/0168413 A1 | 7/2007 | Barletta et al. |
| 2007/0204319 A1 | 8/2007 | Ahmad et al. |
| 2007/0239676 A1 | 10/2007 | Stonehocker et al. |
| 2007/0260634 A1 | 11/2007 | Makela et al. |
| 2007/0288444 A1 | 12/2007 | Nelken et al. |
| 2008/0022844 A1 | 1/2008 | Poliner et al. |
| 2008/0026355 A1 | 1/2008 | Petef |
| 2008/0082510 A1 | 4/2008 | Wang et al. |
| 2008/0134264 A1 | 6/2008 | Narendra et al. |
| 2008/0154951 A1 | 6/2008 | Martinez et al. |
| 2008/0215319 A1 | 9/2008 | Lu et al. |
| 2008/0235872 A1 | 10/2008 | Newkirk et al. |
| 2008/0249982 A1 | 10/2008 | Lakowske |
| 2008/0255937 A1 | 10/2008 | Chang et al. |
| 2008/0256115 A1 | 10/2008 | Beletski et al. |
| 2009/0030686 A1 | 1/2009 | Weng et al. |
| 2009/0031882 A1 | 2/2009 | Kemp et al. |
| 2009/0055190 A1* | 2/2009 | Filev ................ B60W 50/10 704/270 |
| 2009/0063147 A1 | 3/2009 | Roy |
| 2009/0064029 A1 | 3/2009 | Corkran et al. |
| 2009/0119097 A1 | 5/2009 | Master et al. |
| 2009/0125298 A1 | 5/2009 | Master et al. |
| 2009/0125301 A1 | 5/2009 | Master et al. |
| 2009/0228799 A1 | 9/2009 | Verbeeck et al. |
| 2009/0240488 A1 | 9/2009 | White et al. |
| 2009/0292541 A1* | 11/2009 | Daya ................ G10L 15/063 704/251 |
| 2010/0014828 A1 | 1/2010 | Sandstrom et al. |
| 2010/0049514 A1 | 2/2010 | Kennewick et al. |
| 2010/0158488 A1 | 6/2010 | Roberts et al. |
| 2010/0205166 A1 | 8/2010 | Boulter et al. |
| 2010/0211693 A1 | 8/2010 | Master et al. |
| 2010/0235341 A1 | 9/2010 | Bennett |
| 2010/0241418 A1 | 9/2010 | Maeda et al. |
| 2010/0250497 A1 | 9/2010 | Redlich et al. |
| 2011/0010163 A1 | 1/2011 | Jansen |
| 2011/0046951 A1 | 2/2011 | Suendermann et al. |
| 2011/0060592 A1 | 3/2011 | Kang et al. |
| 2011/0071819 A1 | 3/2011 | Miller et al. |
| 2011/0082688 A1 | 4/2011 | Kim et al. |
| 2011/0132173 A1 | 6/2011 | Shishido |
| 2011/0132174 A1 | 6/2011 | Shishido |
| 2011/0173208 A1 | 7/2011 | Vogel |
| 2011/0213475 A1 | 9/2011 | Herberger et al. |
| 2011/0244784 A1 | 10/2011 | Wang |
| 2011/0276334 A1 | 11/2011 | Wang et al. |
| 2011/0288855 A1 | 11/2011 | Roy |
| 2012/0029670 A1 | 2/2012 | Mont-Reynaud et al. |
| 2012/0232683 A1 | 9/2012 | Master et al. |
| 2013/0052939 A1 | 2/2013 | Anniballi et al. |
| 2013/0080167 A1* | 3/2013 | Mozer ................ G10L 15/22 704/246 |
| 2013/0110511 A1 | 5/2013 | Spiegel et al. |
| 2013/0185072 A1 | 7/2013 | Huang et al. |
| 2013/0304469 A1 | 11/2013 | Kamada et al. |
| 2014/0019483 A1 | 1/2014 | Mohajer |
| 2014/0316785 A1 | 10/2014 | Bennett et al. |

FOREIGN PATENT DOCUMENTS

| | | |
|---|---|---|
| EP | 1367590 | 12/2003 |
| EP | 1367590 A2 | 12/2003 |
| JP | H11-272274 | 10/1999 |
| JP | H11-272274 A | 10/1999 |
| JP | 2000187671 | 7/2000 |
| JP | 2000187671 A | 7/2000 |
| WO | 9517746 | 6/1995 |
| WO | 9517746 A1 | 6/1995 |
| WO | 99/18518 | 4/1999 |
| WO | 99/18518 A2 | 4/1999 |
| WO | 03061285 | 7/2003 |
| WO | 03061285 A2 | 7/2003 |
| WO | 2004091307 | 10/2004 |
| WO | 2004091307 A2 | 10/2004 |
| WO | 2008004181 | 1/2008 |
| WO | 2008004181 A2 | 1/2008 |
| WO | 2010018586 | 2/2010 |
| WO | 2010018586 A2 | 2/2010 |
| WO | 2013177213 | 11/2013 |
| WO | 2013177213 A2 | 11/2013 |

OTHER PUBLICATIONS

Zlatanov, T. "Cultured Perl", Nov. 2004, 13 pgs. [retrieved Oct. 22, 2014]. Retrieved from the Internet: <URL: http://www.ibm.com/developerworks/linux/library/l-cpregex/index.html>.

Younger, D. H., "Recognition and parsing of context-free languages in time n3", Information and Control, vol. 10, Issue 2, Feb. 1967, pp. 189-208.

Guzzino, Didier, "Active: A Unified Platform for Building Intelligent Applications", Jan. 23, 2008, 263 pgs.

"Nuance Recognizer 9.0: Language Pack Guide", Nuance Communications, Inc., 2007, 34 pgs.

Conway, D., et al., "Synopsis 5: Regexes and Rules", Version 158, Created Jun. 24, 2002 and Last Modified Jul. 31, 2012 [retrieved Sep. 26, 2012], Retrieved from Internet: <http://perlcabal.org/syn/s05.html>, 65 pages.

Grammar's Developers Guide, Nuance Speech Recognition System, Version 8.5, Copyright 2003 Nuance Communications Inc., Menlo Park, CA, 262 pages.

Wang, A.L., "An Industrial-Strength Audio Search Algorithm," In ISMIR 2003, 4th Symposium Conference on Music Information Retrieval(Oct. 26, 2003), pp. 7-13.

Venkatachalam, V., Cazzanti, L., Chillon, N., Wells, M., "Automatic Identification of Sound Recordings," Signal Processing Magazine, IEEE, Mar. 2004, 92-99, vol. 21, Issue 2.

Nelson, J., V Cast Song ID from Verizon Wireless. May 21, 2007 [retrieved on Jul. 24, 2014], Retrieved from Internet: <http://www.verizonwireless.com/news/article/2007/05/pr2007-05-21a.html>.

App Shopper Shazam: http://appshoppercom/music/shazam. Last changed Jul. 24, 2014.

Gracenote Mobile MusicID: http://web.archive.org/web/20100123211802/http://www.gracenote.com/busine-ss.sub.-solutions/mobileMusic/. Last accessed Jan. 23, 2010.

(56) References Cited

OTHER PUBLICATIONS

App Shopper MusicID: http://appshopper.com/music/musicid. Last changed Jul. 14, 2014.
Xu, et al. "Music Identification Via Vocabulary Tree with MFCC Peaks," MIRUM '11 Proceedings of the 1st international ACM workshop on Music information retrieval with user-centered and multimodal strategies, 2011. p. 21-26.http://dl.acm.org/citation.cfm?doid=2072529.2072537.
Li, et al. "Robust Audio Identification for MP3 Popular Music," SIGIR '10 Proceedings of the 33rd international ACM SIGIR conference on Research and development in information retrieval, Jul. 2010. p. 627-634.http://dl.acm.org/citation.cfm?doid=1835449.1835554.
Yu, et al. "A Query-By-Singing System for Retrieving Karaoke Music," IEEE Transactions on Multimedia, Dec. 2008, vol. 10, No. 8, p. 1626-1637. http://ieeexplore.ieee.org/xpl/articleDetails.jsp?arnumber=4694852.
Liu, et al. "Content-Based Retrieval of MP3 Music Objects," CIKM '01 Proceedings of the tenth international conference on Information and knowledge management, 2001. p. 506-511. http://dx.doi.org/10.1145/502585.502670.
OMRAS2—Ontology-Driven Music Retrieval & Annotation Sharing Service. Overview—Apr. 24, 2009 [Accessed Jul. 24, 2014—Archive.org] http://web.archive.org/web/20090424083019/http://www.omras2.org/overview. 2 pages.
OMRAS2—AudioDB—Populating and Querying an AudioDB Instance. (No archived version available—accessed Jul. 24, 2014 via Google) http://omras2.org/audioDB/tutorial1. 3 pages.
Benson, et al. "Sync Kit: A Persistent Client-Side Database Caching Toolkit for Data Intensive Websites," Proceedings of the 19th International Conference on World Wide Web, Apr. 2010. pp. 121-130. http://dl.acm.org/citation.cfm?id=1772704.
Larson, et al. "NYT to Release Thesaurus and Enter Linked Data Cloud," NY Times Blogs, Jun. 2009. http://open.blogs.nytimes.com/2009/06/26/nyt-to-release-thesaurus-and-ent- erlinked-data-cloud/.
"Aurix Enhances Effectiveness of Leading Search Software," Aurix. com—News. Jun. 1, 2010. http://www.aurix.com/pages/3808/Aurix.sub.-enhances.sub.--effectiveness.- sub.-of .sub.--leading.sub.--search.sub.-software.htm.
"Hearing it Loud & Clear at SpeechTEK 2010," Aurix.com—News. Jul. 21, 2010, http://www.aurix.com/pages/4161/State.sub.-of .sub.--the.sub.--art.sub.--speech.sub.-technology.htm.
Jamil, "A Natural Language Interface Plug-In for Cooperative Query Answering in Biological Databases," BMC Genomics, Nov. 2011. (Accessed Sep. 27, 2012 via SpringerLink) http://www.biomedcentral.com/1471-2164/13/S3/S4.
Feng, "A General Framework for Building Natural Language Understanding Modules in Voice Search," 2010 IEEE International Conference on Acoustics Speech and Signal Processing (ICASSP), Mar. 2010. (Accessed Jul. 24, 2014—IEEE)http://ieeexplore.ieee.org/xpl/articleDetails.jsp?arnumber=5494951.
Langanke, "Direct Voice Control Speech Data Entry and Database Query Models," International Symposium on Logistics and Industrial Informatics, Sep. 2007. (Accessed Jul. 24, 2014—IEEE)http://ieeexplore.ieee.org/xpl/articleDetails.jsp?arnumber=4343522.
Indukuri, et al. "Natural Language Querying Over Databases Using Cascaded CRFs," Lecture Notes in Computer Science, Sep. 2010, http://www.springerlink.com/content/5w1x27650475304m.
Kolias, et al. "Design and implementation of a VoiceXML-driven wiki application for assistive environments on the web," Personal and Ubiquitous Computing, Sep. 2010. vol. 14, No. 6, p. 527-539,http://www.icsd.aegean.gr/publication.sub.-files/journal/295233664.pdf.
Gracenote: MusicID, available at http://www.gracenote.com/business.sub.--solutions/music.sub.--id/, last accessed Aug. 4, 2010.
Shazam: http://web.archive.org/web/20100501190631/http://www.shazam.com/. Last accessed May 1, 2010.
ATT, "Conversant VIS Version 4.0 Whole Word Bilingual Speech Recognition", Issue 1, Oct. 1993, 86 pgs.
"Contact Center Business Planning Guide", Avaya Inc., 2010, 8 pgs.
"Avaya Self-Service Optimization. Optimize the Performace of your Avaya Self-Service applications", Avaya, Inc., 2011, 4 pgs.
"VoiceXML Tutorial. Developer documentation", Bevocal, Inc., 2005, 68 pgs.
Brick, T, et al. "Incremental Natural Language Parsing for HRI", Journal of the Association for Computing Machinery, Mar. 10-12, 2007, 8 pgs.
Charniak, E., et al. "Edge-Based Best-First Chart Parsing", 1998, 8 pgs.
Crisostomo, A. "Constituents and Phrases", Jul. 2011, 43 pgs.
Copestake, A, et al., "Minimal Recursion Semantics: An Introduction" Research on Language and Computation, vol. 3, pp. 281-332, 2005.
Deobhakta, N., "Natural Language Processing, User Interfaces, and the Semantic Web". Proceedings from the Third Annual HCI Symposium, Dec. 2012, 22 pgs.
"ECMAScript Language Specification", ECMA-262, ECMA International, 5.1 Edition, Jun. 2011, 258 pgs.
Graham, P., "Parsing with ATNs. On Lisp: Advanced Techniques for Common Lisp", Engelwood Cliffs, NJ, Prentice Hall, 1993, 16 pgs.
McKeown, K., "Semantic Analysis: Syntax-Driven Semantics", 27 pgs. [retrieved Jun. 17, 2014]. Retrieved from the Internet: <URL: <http://www.google.com/url?sa=t&rct=j&q=&esrc=s&source=web&cd=2&ved=0CCEQFjAB&url=http%3A%2F%2Fwww1.cs.columbia.edu%2F~kathy%2FNLP%2FClassSlides%2FClass13SemanticAnalysis%2Fsemantics.ppt&ei=Xdb4VMPDlcvsoAS2soGABg&usg=AFQjCNGiXuBWLO-pQB_MLor_kN_8ATdpRg&sig2=BnvJvvJJo3OApAC6ny0guQ&bvm=bv.87611401,d.cGU>>.
Huang, L, et al., "Dynamic Programming for Linear-Time Incremental Parsing". Proceedings of the 48th Annual Meeting of the Association for Computational Linguistics, pp. 1077-1086, Jul. 2010.
Iqbal, R, et al., "A Negation Query Engine for Complex Query Transformations". Journal of Science and Technology, pp. 193-204, 2013.
Klein, D, et al. "Accurate Unlexicalized Parsing", Proceedings of the 41st Meeting of the Association for Computational Linguistics, vol. 1, pp. 423-430, 2003.
Matsubara, S, et al., "Chart-based Parsing and Transfer in Incremental Spoken Language Translation", Proceedings of the Fourth Natural Language Processing Pacific Rim Symposium, 1997, 4 pgs.
Mohri, M, et al., "Weighted Finite-State Transducers in Speech Recognition", Computer Speech and Language, Jan. 2002, 26 pgs.
Murase, T, et al., "Incremental CFG Parsing with Statistical Lexical Dependencies", Proceedings of the Sixth Natural Language Processing Pacific Rim Symposium, Nov. 2001, 9 pgs.
New, B., "Question Answering at TREC", Pre-Internship report, Mar. 2008. 4 pgs.
Nortel Norstar, "Voice Mail Speech Recognition Automated Attendant", Product manual [online]. 29 pgs. Nortel Norstar [retrieved Sep. 4, 2012]. Retrieved from the Internet: <URL: https://downloads.avaya.com/css/P8/documents/100141923>.
Norvell, T., "A Short Introduction to Regular Expressions and Context Free Grammars", Project report, Nov. 2002, 5 pgs.
Quesada, J, et al. "Design of a Natural Language Command Dialogue System". Project deliverable 3.2, Siridus, 2000, 91 pgs.
Seneff, S., "TINA: A Natural Language System for Spoken Language Applications", Journal of the Association for Computational Linguistics, 18 (1), pp. 61-82, Mar. 1992.
Seneff, S, et al., "Galaxy-II: A Reference Architecture for Conversational System Development", Proceedings of the International Conference on Spoken Language Processing, Nov. 1998, 5 pgs.
Stolcke, A., "An Efficient Probabilistic Context-Free Parsing Algorithm that Computes Prefix Probabilities", Journal of the Association for Computational Linguistics, 21 (2), Jun. 1995, pp. 165-201.
Wagstaff, J., "Loose Wire: New Service Identifies Songs You Hum," WSJA Weekend Journal. Copyright 2006, Dow Jones & Company, Inc. Dec. 25, 2006. Factiva, Inc. 2 pages.
Mobile Music: Comcast Cellular First in U.S. To Trial Breakthrough Interactive Music Service Called *CD. Copyright PR Newswire, New York. ProQuest LLC. Feb. 11, 1999. Retrieved from the

(56) References Cited

OTHER PUBLICATIONS

Internet: <http://proquest.umi.com.libproxy.mit.edu/pqdwb?did+38884944&sid=3&Fmt=3&clientld=5482&RQT=309&VName=PQD>. 3 pages.

Wold et al., "Content-Based Classification, Search and Retrieval of Audio", IEEE Multimedia 1070-986X/96, vol. 3, No. 3: Fall 1996, pp. 27-36 (17 pages).

McKeown, K., "Semantic Analysis: Syntax-Driven Semantics", 27 pgs. [retrieved Jun. 17, 2014]. Retrieved from the Internet: <URL: <http://www.google.com/url?sa=t&rct=j&q=&esrc=s&source=web&cd=2&ved=0CCEQFjAB&url=http%3A%2F%2Fwww1.cs.columbia.edu%2F~kathy%2FNLP%2FClassSlides%2FClass13SemanticAnalysis%2Fsemantics.ppt&ei=Xdb4VMPDIcvsoAS2soGABg&usg=AFQjCNGiXuBWLO-oQB_MLor_kN_8ATdpRg&sig2=BnvJvvJJo3OApAC6ny0guQ&bvm=bv.87611401,d.cGU>>.

Zlatanov, T. "Cultured Perl", Nov. 2004, 13 pgs. [retrieved Oct. 22, 2014]. Retrieved from the Internet: <URL: http://www.ibm.com/developerworks/linux/library/1-cpregex/index.html>.

InData Corporation, DepoView Video Review Software Product Description, "InData's Newest Video Deposition Viewer", Dec. 2007, 2 pgs.

InData Corporation, DepoView DVD, Video Review Software Product Brochure, Jun. 2008, 4 Pgs.

InData Corporation, DepoView Video Review Software Product Description, http://indatacorp.com/depoview.html, accessed Nov. 8, 2011, 2 Pgs.

Sony Ericsson's W850i Walkman Phone Now Available in the Middle East. Al-Bawaba News, 2006 Al-Bawaba. Dec. 11, 2006. Factiva, Inc. <www.albawaba.com>. 2 pages.

Blackburn, S G., "Content Based Retrieval and Navigation of Music," University of Southampton, Departmenf of Electronics and Computer Science, Faculty of Engineering and Applied Science, Mar. 10, 1999, 41 Pages.

Blackburn, S., et al. "A Tool for Content Based Navigation of Music," University of Southampton, Department of Electronics and Computer Science, Multimedia Research Group, Copyright 1998 ACM 1-58113-036-8/98/0008, pp. 361-368.

Blackburn, S G., "Content Based Retrieval and Navigation of Music Using Melodic Pitch Contours," University of Southampton, Department of Electronics and Computer Science, Faculty of Engineering and Applied Science, Sep. 26, 2000, 136 Pages.

Blackburn, S G. "Search by Humming". University of Southampton, Department of Electronics and Computer Science, Faculty of Engineering, May 8, 1997, 69 Pages.

Hum That Tune, Then Find it on the Web. NPR: Weekend Edition—Saturday, WKSA. Copyright 2006 National Public Radio. Dec. 23, 2006. Factiva, Inc. 2 pages.

Casey, M. A., et al., "Content-Based Music Information Retrieval: Current Directions and Future Challenges". Apr. 2008, vol. 96, No. 4, Copyright 2008 IEEE, Retrieved from IEEE Xplore [retrieved on Dec. 29, 2008 at 18:02], 29 Pages.

Wagstaff, J., "Loose Wire: New Service Identifies Songs You Hum," WSJA Weekend Journal. Copyright 2006, Dow Jones & Company, Inc. Dec. 25, 2006. Factiva, Inc. 2 pages.

Saltzman, M., "The Best Things in life are Free—For Your iPhone," Home Electronics and Technology, For Canwest News Service. Copyright 2008 Edmonton Journal. Nov. 12, 2008. Factiva, Inc. 2 pages.

First Products with Gracenote Technology to Ship in 2008. Warren's Consumer Electronics Daily. Copyright 2007 Warren Publishing, Inc. Sep. 18, 2007. Factiva, Inc. 2 pages.

Gracenote Readies New Services, But Video Initiative Stalls. Warren's Consumer Electronics Daily. Copyright 2005 Warren Publishing, Inc. vol. 5; Issue 122. Jun. 24, 2005. Factiva, Inc. 2 pages.

Furui, S., "Digital Speech Processing, Synthesis, and Recognition". Second Edition, Revised and Expanded. Nov. 17, 2000. ISBN 978-0824704520. 17 pages.

Ghias, A., et al. "Query by Humming," Musical Information Retrieval in an Audio Database, Cornell University 1995, 6 Pages.

Ghias, A., et al. "Query by Humming—Musical Information Retrieval in an Audio Database," ACM Multimedia 95—Electronic Proceedings, San Francisco, CA, Nov. 5-9, 1995, 13 Pages.

Han, B., et al. "M-Musics: Mobile Content-Based Music Retrieval System". Copyright 2007, Augsburg, Bavaria, Germany. ACM 978-1-59593-01-8/07/0009. Sep. 23-28, 2007. pp. 469-470. 2 Pages.

Jang, J.R., et al. "A General Framework of Progressive Filtering and its Application to Query to Singing/Humming". IEEE Transactions on Audio, Speech, and Language Processing, vol. 16. No. 2, Feb. 2008. pp. 350-358. 9 Pages.

Kosugi, N., et al. "A Practical Query-By-Humming System for a Large Music Database". NTT Laboratories, Japan. ACM Multimedia Los Angeles, CA, USA. Copyright ACM 2000 1-58113-198-4/00/10. pp. 333-342. 10 Pages.

McNab, R. J., et al. "Towards the Digital Music Library: Tune Retrieval from Acoustic Input". University of Waikato, Department of Computer Science, School of Education. DL 1996, Bethesda MD USA. Copyright 1996 ACM 0-89791-830-4/96/03. p. 11-18. 8 Pages.

McNab, R. J., et al. "The New Zealand Digital Library MELody inDEX". University of Waikato, Department of Computer Science. D-Lib Magazine, May 1997 [retrieved on Jun. 12, 2011 at 11:25:49 AM]. ISSN 1082-9873 Retrieved from the Internet: <http://dlib.org/dlib/may97/meldex/05written.html>, 13 pages.

Pardo, B., et al. "The VocalSearch Music Search Engine". EECS, Northwestern University. JCDL 2008, Pittsburgh, Pennsylvania, USA. Jun. 16-20, 2008, ACM 978-1-59593-998-2/08/06. p. 430. 1 Page.

Mobile Music: Comcast Cellular First in U.S. To Trial Breakthrough Interactive Music Service Called *CD. Copyright PR Newswire, New York. ProQuest LLC. Feb. 11, 1999. Retrieved from the Internet: <http://proquest.umi.com.libproxy.mit.edu/pqdwb?did+38884944&sid=3&Fmt=3&clientId=5482&RQT=309&VName=PQD>. 3 pages.

Song, J., et al. "Query by Humming: Matching Humming Query to Polyphonic Audio," LG Electronics, Seoul, Korea. Copyright 2002 IEEE. 0-7809-7304-9/02. pp. 329-332. 4 Pages.

Taylor, C., "Company Lets Listeners Dial for CDs," Billboard, vol. 1, No. 26, General Interest Module, Jun. 26, 1999, pp. 86-87, 2 pages.

"Can't Get That Song Out of Your Head," Copyright 2007, The Jakarta Post, May 20, 2007, Factiva, Inc, 2 Pages.

Typke, R., et al., "A Survey of Music Information Retrieval Systems," Universiteit Utrecht, The Netherlands. Copyright 2005 Queen Mary, University of London. 8 Pages.

Wang, A., "The Shazam Music Recognition Service". Communications of the ACM, vol. 49, No. 8. Aug. 2006. ACM 0001-0782/06/0800. pp. 44-48. 5 pages.

Melodis Rolls Out midomi mobile. Wireless News. Copyright 2008 M2 Communications, Ltd. Mar. 6, 2008. 1 Page.

Zhu, Y., et al. "Warping Indexes with Envelope Transforms for Query by Humming". New York University, New York. SIGMOD Copyright 2003, San Diego, CA. Jun. 9-12, 2003. ACM 1-58113-634-X/03/06. pp. 181-192. 12 Pages.

Wang et al., "Method and Apparatus for Recognizing Sound and Music Signals in High Noise and Distortion", U.S. Appl. No. 60/222,023, dated Jul. 31, 2000, 26 pages.

Rhoads, G., "Methods and Systems Employing Digital Watermarking", U.S. Appl. No. 60/134,782, dated May 19, 1999, 47 pages.

Finley, Michael, et al., "Broadcast Media Purchasing System", U.S. Appl. No. 60/166,965, dated Nov. 23, 1999, 21 pages.

Swierczek, Remi, "Music Identification System", U.S. Appl. No. 60/158,087 dated Oct. 7, 1999, 12 pages.

Swierczek, Remi, "Music Identification System", U.S. Appl. No. 60/186,565, dated Mar. 2, 2000, 14 pages.

Chou, Ta-Chun, et al., "Music Databases: Indexing Techniques and Implementation", Proceedings of International Workshop on Multimedia Database Management Systems, IEEE, dated Aug. 14-16, 1996, pp. 46-53, 8 pages.

McPherson, John R. and Bainbridge, David, "Usage of the MELDEX Digital Music Library", 1999, in Proceedings of the International Symposium on Music Information Retrieval, (Bloomington, IN, USA, 2001), pp. 19-20, 2 pages.

(56) References Cited

OTHER PUBLICATIONS

Wold, Erling, et al., "Classification, Search, and Retrieval of Audio", Muslce Fish, Berkeley, CA, USA, CRC Handbook of Multimedia Computing 1999, pp. 1-19, 18 pages.
Wold et al., "Content-Based Classification, Search and Retrieval of Audio", IEEE Multimedia 1070-986X196, vol. 3, No. 3: Fall 1996, pp. 27-36 (17 pages).
Horn, Patricia, "What was that song? With a wireless phone, find out what you heard on the radio.", The Inquirer, Philadelphia, Pennsylvania, USA, dated Feb. 11, 1999, 3 pages.
Kenyon, Stephen, et al., U.S. Appl. No. 60/218,824 for Audio Identification System and Method, Jul. 18, 2000, 45 pages.
Kenyon, Stephen, U.S. Appl. No. 60/155,064 for Automatic Program Identification System and Method, Sep. 21, 1999, 49 pages.
Ranta, A., "Grammatical Framework: Programming with Multilingual Grammars," Slides for the GF book, CSLI Stanford, Copyright 2011, 440 pages.
Ranta, A., "Grammatical Framework Tutorial", Copyright Dec. 2010 for GF 3.2 [retrieved on Sep. 13, 2012], Retrieved from Internet: <http://www.grammaticalframework.org/doc/tutorial/gf-tutorial.html>. 68 pages.
"Grammatical Framework" Version 3.3.3, Copyright Mar. 2012 [retrieved on Sep. 23, 2012], Retrieved from Internet: <http://www.grammaticalframework.org>. 4 pages.
VoiceXML Tutorial (Nuance), BeVocal, Inc., Mountain View, CA, Copyright 2005, 68 pages.
JavaScript Quick Reference, BeVocal Inc. (Nuance), Mountain View, CA, Copyright 2005, 24 pages.
Grammar Reference, BeVocal, Inc. (Nuance), Mountain View, CA, Copyright 2005, 102 pages.
Ranta, A., "Creating Linguistic Resources with the Grammatical Framewor," LREC Tutorial, Malta, May 17, 2010, 75 pages.

\* cited by examiner

ADVERTISEMENT SELECTION BY LINGUISTIC CLASSIFICATION

CROSS REFERENCE AND RELATED APPLICATIONS

This application is a continuation of U.S. application Ser. No. 15/385,493 filed on 20 Dec. 2016, now U.S. patent Ser. No. 10,311,858, issued 4 Jun. 2019, entitled "Method and System For Building An Integrated User Profile" which is a continuation of U.S. application Ser. No. 14/704,833 filed on 5 May 2015, now U.S. Pat. No. 9,564,123, issued 7 Feb. 2017, entitled "Method and System For Building An Integrated User Profile", naming inventors Joel Gedalius, Jun Huang, Kiran Garaga Lokeswarappa, and Bernard Mont-Reynaud, which claims the benefit of U.S. Application No. 61/992,172 filed on 12 May 2014. The priority applications are hereby incorporated by reference.

TECHNICAL FIELD

This invention relates to voice and text processing, and more particularly to methods and systems that extract user profile information from speech and text input, for use in advertisement targeting and other applications.

BACKGROUND

A variety of computer-based services could be provided more effectively if the service provider could tailor the service to the preferences of a particular user. For example, a fact of the contemporary Internet is that its users are frequently exposed to advertising; yet, users may be annoyed by these advertisements (ads), especially when these advertisements are irrelevant to the user's interests. To support choosing advertisements judiciously, known or presumed characteristics and preferences of a user are collected in a user profile. Hence, a user profile is a collection of user characteristics and preferences.

User profiles are populated with information provided directly from the user such as the user's name and location. However, service providers need more detailed information to personalize interactions with a user.

Software service providers have attempted to build user profiles that contain as much information as possible about the user in order to tailor the content presented to the user, and/or its mode of delivery. Users may balk at providing anything more than minimal data: completing questionnaires is burdensome, and users do not want to give up their privacy by disclosing the requested personal data. Thus collecting additional user information is best performed without requiring additional effort for the users, and with a limited invasion of a user's privacy. One technique service providers have used is monitoring user web browsing activity and keystrokes. However, this is seen by many as too invasive. As a result, marketers still look for effective yet acceptable ways to assess user characteristics and preferences in order to present more effective marketing messages.

SUMMARY

A user profile includes of a set of properties that describe user characteristics and preferences. One aspect of the present disclosure is a method for building a user profile using speech-based information (after receiving the user's permission). A system module may receive speech as input, extract speech features from those inputs, and produce a text transcription of the input speech, from which language-based features may also be gathered. The extracted features may be used to determine information about the user for inclusion in the user's profile. Extracted features may be used in isolation, or detected patterns in a combination of extracted features may be used to infer user characteristics. Simple examples include: the pitch of a user's voice may provide a clue as to the user's age and/or gender. An accent may provide a clue as to a user's ethnicity or home location. The variety and sophistication of vocabulary used may indicate a level of education and/or English proficiency, and subject matter discussed may provide insight into socio-economic status.

A user profile augmented in this way may be used by a variety of applications that tailor user interactions based on profile information. One kind of application that benefits from a rich user profile is one that selects advertising that would be relevant to the user.

The system module described above performs speech recognition and natural language understanding. In an implementation, the information added to the user profile may be used by any application that personalizes user interaction. In another implementation, a feature extraction module may be included within a particular application that accepts natural language as input. The resulting user profile information may be shared with other applications or may be private to that particular application.

DETAILED DESCRIPTION

Figure 1:
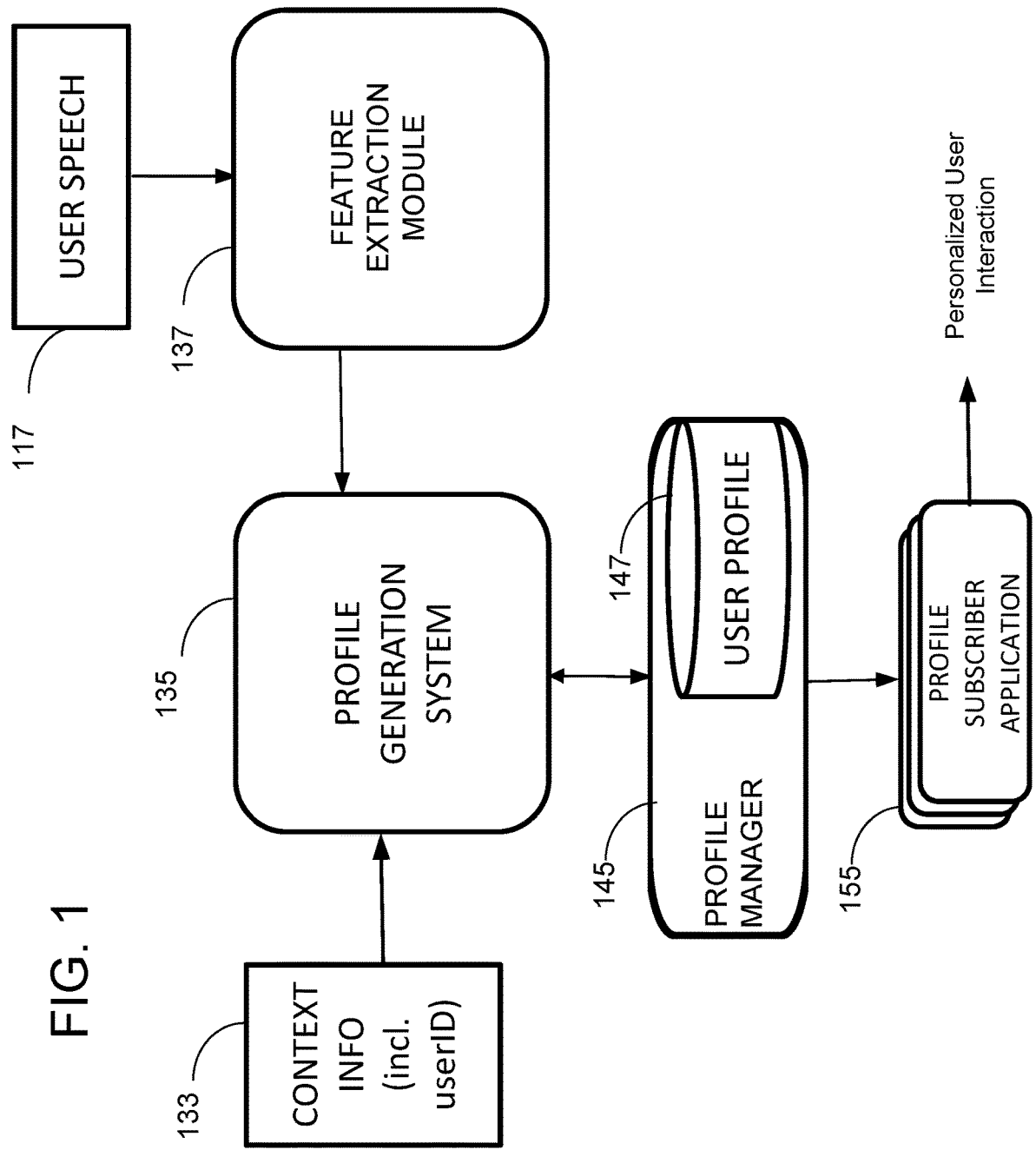
FIG. 1 is a block diagram illustrating a high-level overview of an implementation of the present disclosure involving interactions between a feature extraction module and a profile generation system.

Examples of the relevance of user profile information abound. If a user searches for music, an online ad system can use of the estimate of the user's age to select for display a music ad that may be of interest to a person of the user's age. Gender-based and age-based ad targeting is applicable to many types of products; however, the age or gender of users is not always entered explicitly into the system. An intelligent system can try to infer the probable age or gender of a user based on a statistical analysis of user inputs. In the case of clothing and many other products, using socio-economic status information may be essential in addition to using information about age and gender. If a user's socio-economic status (SES) is known, the information can be used to select ads that marketers have aimed at a specific demographic.

The technology disclosed herein is directed to detecting user characteristics based on attributes of their speech including acoustic features such as pitch or speed, acoustic-phonetic features such as accent, or linguistic features such as use of grammar and vocabulary. A feature extraction module working in conjunction with a user profile generator may create a richer set of property values representing user characteristics, or add confidence to property values inferred in other ways. An application benefitting from an enriched user profile need not use natural language interfaces. An advertisement application can use the profile information to increase effectiveness for advertisers. Applications can also benefit from the additional property values by improving the overall experience of users by adjusting the content and the style of the system output to the specific user and increase effectiveness for advertisers.

Also, the additional user profile information may aid applications with natural language interfaces to be tuned or customized to a particular user. For example, once a user's accent has been inferred, this information can be used in a car navigation system to address the user with voice instructions bearing a similar, familiar accent; or the choice of words may also be based on a regional or geographical constraint (e.g., Australian English). In addition, accent detection allows the adaptation of a speech recognizer's acoustic model, improving the reliability of understanding the user. Naturally, inferred region, culture, or ethnicity must be performed with high confidence to avoid a user's negative reaction to the system making incorrect assumptions. The joint use of accent and language clues can improve reliability. More broadly, it is most effective to identify a user as belonging to a group of people sharing various combinations of regional accent, regional language, educational level, and SES.

Advertisement selection applications are well-suited for using profile data inferred from speech because if a wrong inference is made, the result is that the selected ads are less likely to appeal to the user, but the user is unlikely to be offended by a mistargeted ad.

Definitions

Figure 3:
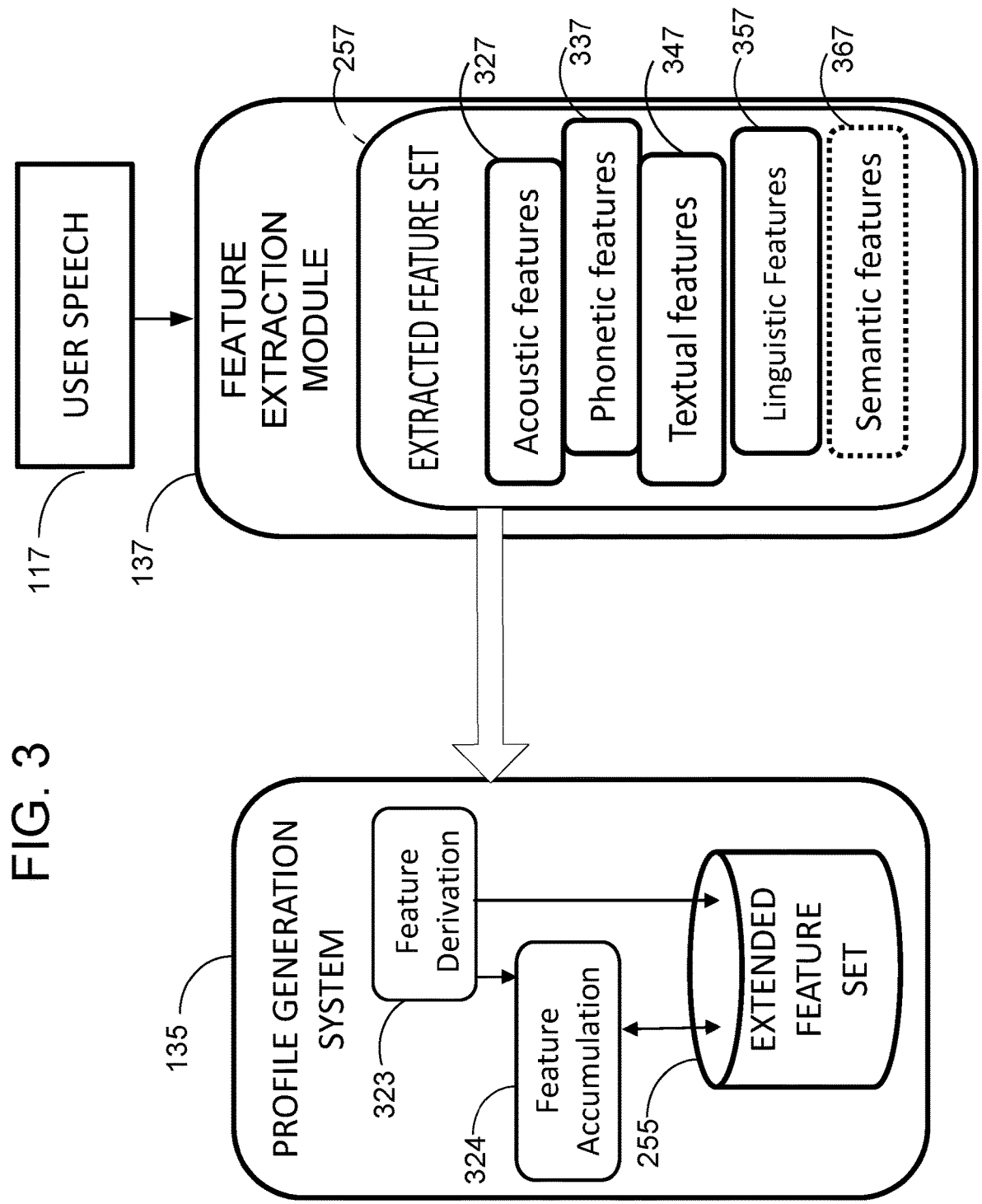
FIG. 3 is a block diagram that illustrates the main features extracted by a feature extraction module to be used in profile generation, according to an implementation of the invention.

Features: The word "feature" is an umbrella term broadly used in pattern recognition, speech recognition, machine vision and other fields of perceptual processing. It often refers to a distinctive attribute, quality, or property of an object, or frequently of a small area within a larger object. In a software implementation, features may be represented by complex data structures, or simply by numeric or symbolic data values. In the context of this disclosure, the term "primary features" applies specifically to data computed directly from the user's audio input. A speech recognition application typically computes primary features but also extracts additional features, which become part of the application's "extracted feature" set. Yet more features may be derived in one or more steps from the extracted feature set, creating an extended feature set. FIG. 3 illustrates feature categories of primary interest. The different types of features are presented below, and the manner in which they are computed is discussed later.

Acoustic features: Common acoustic features found in speech audio may be represented by the Mel-frequency cepstral coefficients (MFCC). They are computed by well-known techniques: first, the Short-Term Fourier Transform (STFT) is used to process audio input into a sequence of spectral frames; then, further processing of every frame's magnitude spectrum yields the MFCCs, which serve as input to subsequent modules of the speech processing system.

Phonetic features: The most common format for representing phonetic information is a phonetic sequence. A speech recognition system may identify several possible phonetic sequences for a user utterance. Weights may be applied to phonemes within each sequence according to some method of assigning probability. A score for each alternative phonetic sequence may be computed, and the most likely phonetic sequence may be selected based on the score. In some cases, multiple phonetic sequences are kept at the same time, often as a phoneme lattice. In addition, acoustic-phonetic information, including phoneme length (and HMM state info) is available and can also contribute to accent identification and detection. Articulatory-phonetic information includes a variety of secondary features: place and manner of articulation, vowel placement and more.

Textual features: A textual feature comprises a word, a sequence of words, or alternative sequences of words. Many speech recognition systems build a word lattice that collects the most likely word sequences in one data structure.

Linguistic features: Linguistic features include words assembled into grammatical structures, which may be parse trees or syntax trees.

Semantic features: In this context, semantic features focus on the meaning of individual words or phrases (as opposed to that of sentences), meanings which may be expressed by way of table-driven or statistical associations with concepts from one or more domains of discourse.

Classifier: a function taking extracted and/or extended features as input and assigning a value to a user profile property. A classifier function is a software module that is trained as known in the fields of machine learning and pattern recognition. The training data includes known associations between features (usually called a feature vector) and corresponding user characteristics (usually called the ground truth). After training, a classifier can accept a feature vector as input and map it to the most probable property value for that input.

System Overview

FIG. 1 is a block diagram illustrating a high-level overview of an implementation of the present disclosure involving interactions between a feature extraction module and a profile generation system. FIG. 1 illustrates loosely coupled, parallel processing between a Feature Extraction Module 137 and a Profile Generation System 135. The profile generation system 135 may also receive inputs from other sources such as one or more feature extraction modules 137, and user context information 133 including a user ID, user-supplied configuration information, and possibly data from user behavior tracking systems.

Feature extraction module 137 receives speech input, User Speech 117, and analyzes the speech input. In an implementation, the feature extraction module 137 may also transcribe the speech into text, then may analyze the text for linguistic features. The analysis results are provided to the profile generation system. The Profile Manager 145 manages the User Profile 147 and provides a programmatic interface for reading and writing profile property values. The profile generation system interacts with profile manager 145 to retrieve the previously assigned property values and to add new profile property values into the user profile 147. Applications, such as Profile Subscriber Application 155 may retrieve profile property values for personalizing user interaction from the augmented user profile 147 through interaction with the profile manager 145. In an implementation, the profile subscriber application 155 may be an advertisement selection application that selects an advertisement that is expected to be of high relevance to the user. Context Info 133 identifies the user and/or user context including user-supplied information, system supplied information, such as location or time zone, and user characteristics inferred through observing user behavior over time. For example, a user ID or other way of identifying the user may be input into the profile generation system 135. Some of the context info 133 may also be stored in the user profile 147, for example, the user ID. However, the context info 133 may contain contextual information not stored in the user profile 147.

In an implementation, such as shown in FIG. 1, the feature extraction module 137 may operate independently of any vertical natural-language based application. The feature extraction module 137 in this configuration is referred to herein as a stand-alone implementation. In such an implementation, the recognized language may be very broad so as to be relevant across many subject domains. When the feature extraction module is not part of (that is, not included in) a particular vertical application, the user needs to be prompted to talk, or other sources of user speech or text may be relied on for the purpose of generating user profile information.

In another implementation, the feature extraction module 137 may be included in a particular application accepting speech as input. User speech may be obtained naturally by the user interacting with the application, such as asking a question which the application attempts to answer. In addition, the language recognized by the feature extraction module 137 may be more constrained and specific to the subject matter of the vertical application.

Figure 2:
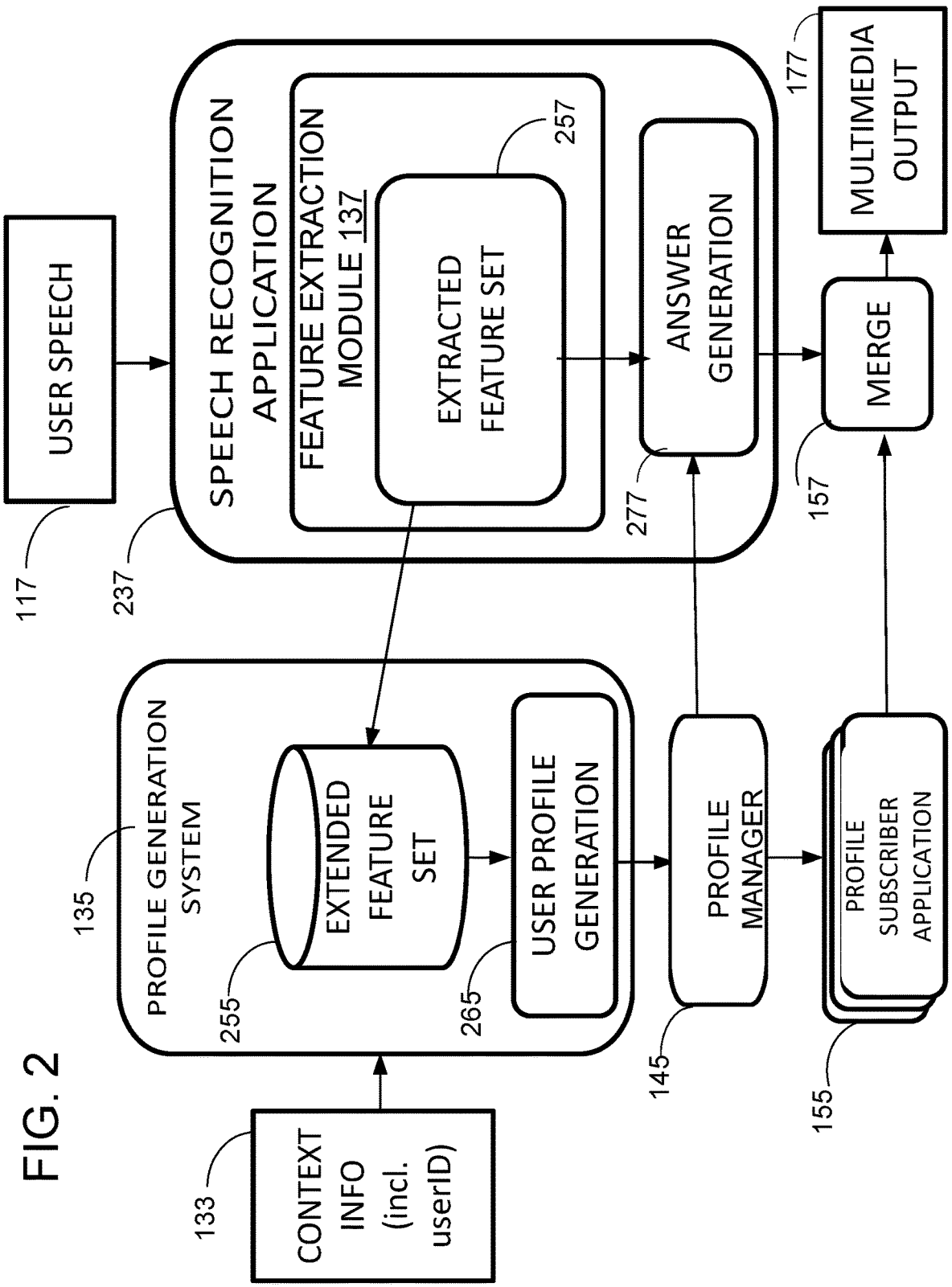
FIG. 2 is a block diagram illustrating interactions between a speech recognition application and a profile generation system, according to an implementation.

FIG. 2 is a block diagram illustrating primarily the interactions between a speech recognition application 237 and a profile generation system 135. Speech recognition application 237 includes the functionality of the feature extraction module 137, the output of which is the extracted feature set 257. Broadly speaking, the flow of a speech recognition application 237 comprises receiving user input such as commands or queries (questions) in the form of user speech 117, extracting a variety of features from the user speech as a step towards understanding the meaning of the input, interpreting the input (not shown) and finally generating a response to a query, such as answering a question in answer generation 277.

In an implementation, the speech input 117 is a sequence of utterances. For purposes of speech recognition, human speech is processed in units or segments called utterances, which represent a single meaning. An utterance may be a word, a group of words, a sentence, or even multiple sentences. Application 237 may process each utterance independently from previous user utterances. For example, an utterance may include all the words spoken before a pause lasting more than some threshold of time. A user utterance (user speech 117) can be received by any conventional means for receiving audio input, such as a microphone. Alternatively, a user utterance can be generated remotely and transmitted to the system. In other implementations, audio may be recorded and played back into a device connected to the system.

The profile generation system 135 receives feature data extracted by the speech application 237 and also has access to context information 133, including the user's unique ID. The textual features and linguistic features may be provided to the profile generation system 135 for an entire utterance when the speech recognition application completes the processing of the utterance, whereas acoustic features may be provided to the profile generation system 135 at a preconfigured time interval (even before the utterance is completed).

The extracted feature set 257 is available as input to the profile generation system 135, which may use parts of it as the basis for creating an extended feature set 255, as explained in FIG. 3. The extended feature set is used by the user profile generation module 265 to compute the likely values of certain user properties. For example, the average spectral shape and average pitch are part of the extended feature set, and they allow statistical inferences to be made about the user's age and/or gender. The user profile generation module 265 is further discussed with FIG. 4. Inferred property values are stored in the user profile 147 using the profile manager 145. User profile 147 may also include profile properties whose values are not inferred from speech input, but determined by the context info 133, such as a user's age, gender and other survey data voluntarily provided by the user, behavioral data collected by a tracking system, and any other information available to the system.

Each user characteristic may be represented in the user profile by a property-value pair applicable to an individual user. Profile instances provide values for the properties, representing user characteristics. Some property values are numerical, such as a user's age in years. Other property values, although they may be encoded numerically, are a selection among an enumerated set of discrete choices: Gender, M or F; for Age, instead of a number (which is more accuracy than available) the system could use categories of age. In one implementation, Age categories might, for example, consist of five distinct groups: 13 and under, 14-18, 19-35, 36-50, and over 50 years. The use of categories is limited by the ability of the system to reliably make necessary distinctions from the extended features. For example, age differences may become more difficult to determine for subjects older than 50, so the upper category may be defined to reflect that granularity.

The user profile 147 may be available both to the speech recognition application 237 and to other applications, such as profile subscriber applications 155. User profile 147 may be stored persistently to a hard disk drive or other non-transitory computer-readable storage medium. Storage persistency allows user profile 147 data to be created during a session, and expanded or modified as new information is received, during the same session or in later sessions.

A profile subscriber application 155 such as an online advertisement application, may retrieve user profile information through an application programming interface (API) and use the information retrieved from the user profile 147 to select ads of potential interest to the user. The answer generation module 277 may also retrieve user profile information, via an API or any other means of inter-process communication, to help with generating a more accurate, personalized answer. For example, a user's age, gender, or level of education, may guide the answer generation module 277 to choose between alternative ways to compose an answer.

The answer from the speech recognition application 237 may be merged with the selected ad in Merge 157, and a Multimedia Output 177 may be provided to the user. This merge process can occur, for example, when two or more outputs share the screen space, as is common in online advertising within a search engine. The merge module 157 may be driven by a screen layout (for visual material such as text, graphics and video) and by preference parameters regarding procedures for audio and video playback, such as whether audio or video will be playing spontaneously, or wait for the user to press the play button, whether video will play with the audio muted, etc. The precise techniques used by the answer generation module 277 and the profile subscriber applications 155 to negotiate their share of the screen and speakers are not essential to this disclosure. In a pure audio (that is, a screen-less) implementation, recorded ads could be mixed into the flow of audio from an application.

An advantage of the cooperation between the speech recognition application 237 and the profile generation system 135 is that features extracted by the feature extractor module 137 of the speech recognition application 237 and used within the application can also be used for profile generation, thereby positively affecting the feature quantity, quality, and speed of augmenting the user profile. This implementation also provides the profile generation system 135 with an abundance of user utterances, received under natural circumstances. In a stand-alone implementation, a speech "mini application", such as an embedded transcription application, may compute a primary feature set 257. In such an implementation the speech application may be hidden inside the system and not directly contribute to the visible multimedia output 177. In another implementation, the primary feature set 257 may be computed by a stand-alone speech "front-end" module 106 with some feature detector, which extracts at least acoustic features, but perhaps not all of the features shown in FIG. 2. When only a subset of the features is extracted and present in the feature set, subsequent processing will only apply to the available information.

Speech input for the asynchronous (or standalone) system can be obtained in a number of ways. In one embodiment, audio input from a completely separate speech application is made available to the profile generation process, but the speech application and profile generation are otherwise be entirely independent beyond the shared audio input. Alternatively, a collection of utterances can be gathered and forwarded to a standalone profile generation system, where the input can be processed in batches; or, recordings of the user's voice can be provided, resulting, for example, from recording sources such as collected voicemails or dictations. These and many other variations lie within the scope of the present disclosure.

FIG. 3 is a block diagram that illustrates the main features extracted by a feature extraction module to be used in profile generation, according to an implementation of the invention. Extracted feature set 257 is the output of a feature extraction module 137 embodied within a speech recognition application. Basic methods of feature extraction in speech recognition are generally known in the art. A brief summary is given here to serve as an exemplary context for the subsequent developments.

Speech features may include the acoustic features 327, phonetic features 337, textual features 347, linguistic features 357, and semantic features 367 of a user utterance.

Acoustic features 327 are those related to pronunciation, pitch and tonal quality of the voice. These are the features of a person's voice that allows one to recognize their voice even when the content of their speech may be gibberish.

Whereas acoustic features may be obtained directly from an utterance, the other features may be obtained indirectly and/or in a non-linear fashion. The states of determining phonetic, textual, linguistic, and semantic features may be maintained in parallel over time. A global likelihood optimization may affect the extraction of these primary features. In this context, "global" means that the optimization affects all of the non-acoustic features: phonetic, textual, linguistic, and semantic. "Likelihood" refers to a probabilistic evaluation of alternative feature representations, enabling prioritization or selection among alternatives. For example, if a phonetic feature of a user utterance is determined to be the phoneme sequence "R-IY-D" (using the CMU phoneme set) the corresponding textual feature representation may be the word "read" or "reed." The likelihood of each of each of these words being correct may be determined based on context (semantic features). For example, if the subject matter of discourse is an orchestra or instrumental music, then "reed" might be the favored transcription, but if the subject matter is a library or bookstore, "read" might be the favored transcription. The likelihood for each word may also be determined based on global frequency of word use (textual features). For example, the word "read" is used more often than "reed" in general speech. Also, the syntax could be used to favor "reed" if the grammar expects a noun or "read" if the grammar expects a verb (linguistic features).

A large number of models and knowledge sources (including language models and tri-state HMMs for phonemes) may all contribute to the determination of the most likely interpretation of the user utterance. Each model relies on constraints. For example, a dictionary may list possible pronunciations for each word as a set phoneme sequences. The selected phonetic features and textual features are bound by this constraint. Linguistic constraints may take the form of statistical language models (SLMs), or stochastic grammars, or a mix of both. Both types of language model affect the likelihood of word sequences and thus the results from this optimization. Even semantic constraints may be brought to bear on this joint optimization, which results in the integration of constraints from different levels of the system. Selection of one feature representation may affect the likelihood of another feature representation. Thus, all non-acoustic features may be optimized in lock-step. Each feature, selected in the context of the other features, may be processed by the profile generation unit within a similar time span.

The extracted feature set 257 comprises more than simple sequences of elements such as frames, states, phonemes, or words, but also may include relationships (such as alignments) or mappings between the elements at successive levels, sufficient to derive additional information. For example, when a speech transcription contains a certain word (in the textual features 347), the extracted feature set 257 also delimits the specific phoneme subsequence (from the phonetic features 337) that matches this word in the transcription; and each phoneme in turn can be mapped to the sequence of states or frames that it spans. Such a cross-referencing capability (between words and phonemes and acoustic features) is often useful for deriving extended features; the generation of extended features 250 is discussed later. In a preferred implementation, the entire set of features 257 extracted by the feature extraction module 137 is visible and available to the profile generation system 135 upon completion of the processing of an utterance (assuming such a defined boundary exists) or after a "pause" of sufficient length, or at the end of each "phrase" or "sentence" or "paragraph"—whatever small grouping unit is appropriate for the application.

There are a variety of ways in which the extracted primary features may be provided to the profile generation system when the features are available for further processing. In an implementation in which the speech recognition application 137 and the profile generation system 135 are tightly coupled, the features may be pushed to the profile generation system by invoking an API provided by the speech recognition application 137, or the profile generation system may pull the features using a callback interface. In an implementation in which the speech recognition application and the profile generation system are more loosely coupled, the extracted features may be pushed by the speech application into a buffer (i.e. a queue) and pulled from the queue by the profile generation system. The buffer may reside in a shared memory area that both the feature extraction module and profile generation system can access.

Profile Property-value Generation

Once received in the profile generation system, the extracted features may be stored along with extended features for the same user over time. Storing features over time may require persistent storage across user utterances, sessions, and across different sources of features, such as multiple feature extraction modules, all of which contribute their results. As mentioned above, user profile data 275 should be specific to an individual, and accordingly, statistics should be gathered on an individual basis. In many cases, user login information supplied as part of the context info 133 is sufficient to retrieve the presumed identity of a user. In this manner, a user profile 147 can be associated with a specific user, and maintained and updated over time.

Alternatively, a non-registered user may only be known to persist within a session (or collection of sessions), and the user profile 147 will, by necessity, be based on a smaller number of interactions. In either case, standard speaker identification techniques may be applied to detect speaker changes, done to address the undesirable case in which the identity of the user (speaker) unexpectedly changes mid-session. Such a speaker change reduces the validity of the statistics being gathered, and their applicability to the current user. When possible, a combination of both approaches (context info 133 and speaker identification techniques) to retrieving the user's identity will support the persistence and reliability of user profile information 275, by restricting the statistics to be computed based on speech features attributed to the same user.

In the absence of speaker changes, the extended feature set 255 is associated either with a known user (in which case statistics may extend over multiple sessions) or with the current user during a single session. This limits the scope of the user profile 147 to the active session.

The Feature Derivation module 323 and feature Accumulation module 324 of the profile generation system 135 use as input the extracted primary feature set to generate an extended feature set 255. In this context, "derivation" refers to a variety of simple computations that may combine some part of the data in the extracted feature set 257 with some other part thereof. For example, a dictionary may attach properties to a word, such as its frequency of use in the general population (relating to its degree of sophistication), or its regional character. Average word length and number of words per sentence may be derived from the transcription to estimate vocabulary levels and reading levels. Other examples of such derivations include: calculating the duration for a phoneme, syllable, word, or pause; looking up the properties of a phoneme in a phoneme table to derive its primary articulatory features such as place and manner of articulation for consonants, or placement for vowels, and phrase structure complexity may be derived from extracted linguistic features. These are just a few of the many simple feature derivations that can be performed. The basic point is that derived features are simple quantities (typically numeric) associated with a very short time span. Derived features are added to the extended feature set 255.

Derived features may be included in the extended feature set 255 as well as provide input to the feature accumulation module 324. Feature accumulation is closely linked with derivation. Many of the accumulated features are based on derived features. Feature accumulation refers to the process of adding and tabulating information across successive time spans, be that frames, phonemes, syllables, words, phrases or entire sentences. Accumulation may be applied directly to features already present in the extended feature set 257; however, accumulation more often is applied to derived features. Accumulation includes generating statistics. The types of statistics accumulated may include means and variances, histograms from which percentiles and medians may be obtained, or other known statistics. Feature accumulation extends the feature set 257 across a larger time span. Example accumulated features include mean syllable duration, mean and variance duration of the 'AY' phoneme (from the CMUP phoneme set), or the frequency of use for a multiple of pronunciations of a particular word (distribution of pronunciations of the word).

Some examples follow; additional details on the construction of extended features will be given later in the sections devoted to specific properties in the user profile.

As mentioned earlier, features such as MFCC frames or spectral frames that are among the acoustic features 327, may be included in the extended feature set 255 in their "raw" state. Global statistics over such features, such as the average spectrum, may be accumulated. The average spectrum (that is, frequency spectrum related to pitch) can be useful for a simple approach to age and gender classification, as well as for more elaborate statistics or classification based on the same features.

Phonetic features 337 such as phoneme sequences or lattices can be processed to derive extended features 255 such as phoneme length, or articulatory-phonetic features, such as the place and manner of articulation for consonants, vowel placement, and other articulatory features that may be used for determining value for the accent property in the user profile.

Textual features 347 are primarily word transcriptions or lattices that can similarly be processed to derive through analysis with dictionaries and tables the extended feature set 255 needed for language-based profile generation 439, such as frequency of use and regional character. The resulting extended features deriving from the textual features 347 can include the average word length and the number of words per sentence.

When a feature extraction model 137 uses an actual grammar, as opposed to a plain SLM, it generates parse trees, from which it can extract measurements like the number of nodes, or the depth of every node. Hence, extended linguistic features may be extracted, derived, and accumulated.

Figure 4:
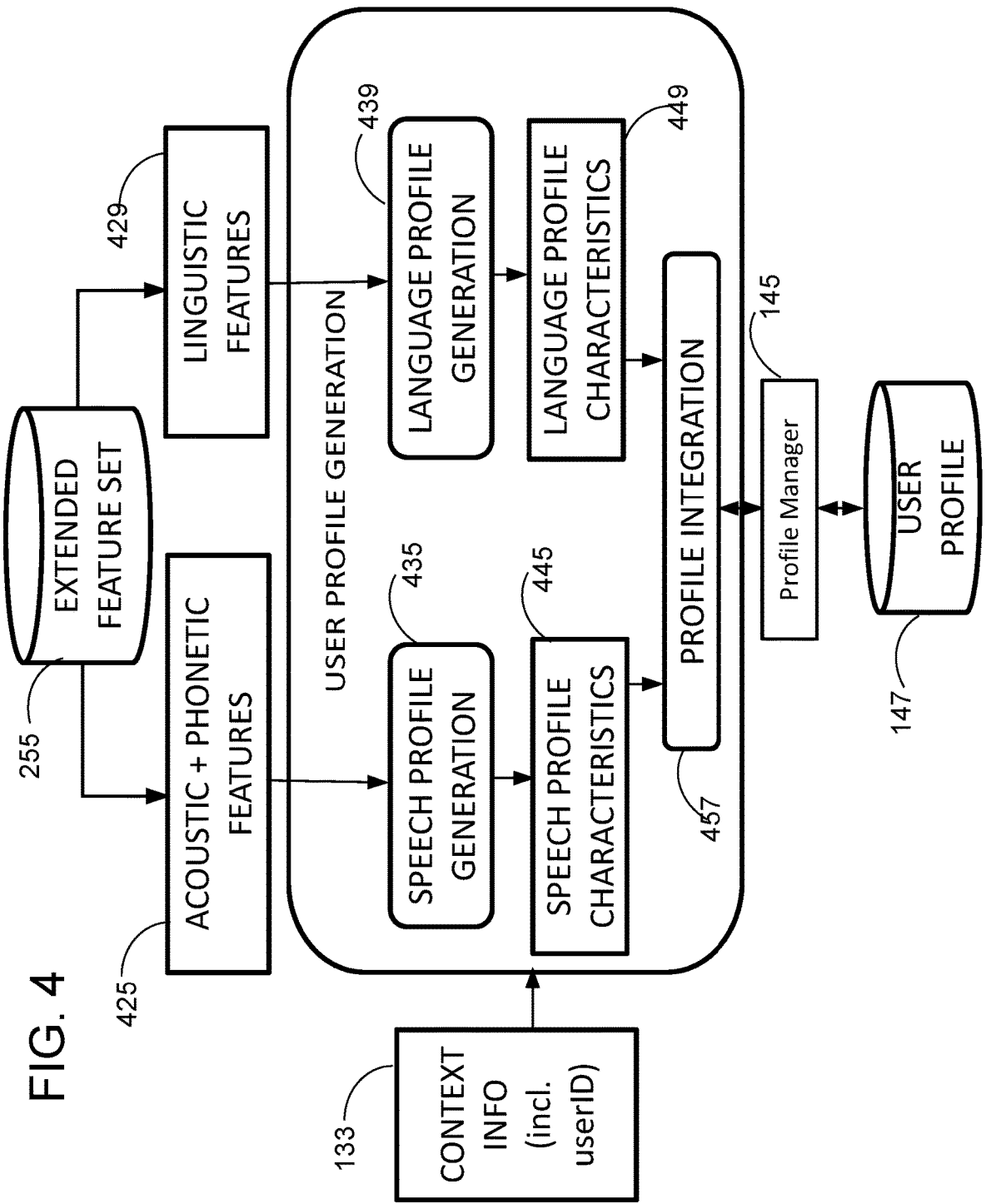
FIG. 4 is block diagram that illustrates the flow of generating information for inclusion in the user profile, according to an implementation of the invention.

FIG. 4 is block diagram that illustrates the flow of generating information for inclusion in the user profile, according to an implementation of the invention. In particular, FIG. 4 shows user profile generation module 265 integrating acoustic and phonetic features 425 with linguistic features 429 to generate the user profile 147. Acoustic and phonetic features 425 are a subset of the extended feature set 255 and are used by speech profile generation module 435 to determine speech profile characteristics 445. Linguistic features 429 are another subset of the extended feature set 255 and are used by language profile generation module 439 to determine language profile characteristics 449. These profile generation modules 435 and 439 may contain classifiers as described above to transform the feature vectors in the extended feature set 255 to profile characteristics. The speech profile characteristics 445 and language profile characteristics 449 are combined in the integrated user profile 467 by the profile integration module 457.

Certain profile characteristics may be computed from one feature source, with the result passed straight through to the integrated user profile 467. In other cases, a profile property value is determined by correlating newly derived/accumulated extended features with previously established property values or across speech-based and language-based features. For example, for young people, age is correlated with both reading level and with education level. Thus, classifiers may constrain profile property values in relation to other property values to improve the accuracy of determining these values. Similarly, there are correlations between English proficiency, education level, SES, and the presence of regional accent. Secondary classifiers may integrate information further. In principle, user profile property values may be determined based on a combination of extended features coming both from speech profile characteristics 445 and language profile characteristics 449. A variety of ensemble methods may be used to achieve the necessary integration.

The reason for dividing acoustic and phonetic features 425 from linguistic features 429 in this implementation pertains to the kinds of characteristics that can be derived from these features. Speech profile characteristics derived from acoustic and phonetic features are independent of the language profile characteristics derived from linguistic features: the first relates to audible characteristics regarding pronunciation such as accent (that is, how a user speaks), while the second is based on transcribed text from the audio to characterize the user's proficiency speaking English (what the user says). Other implementations may use features from both sets (425 and 429) to classify the speech and language profile characteristics together, or from only one feature set (425 or 429).

Figure 5:
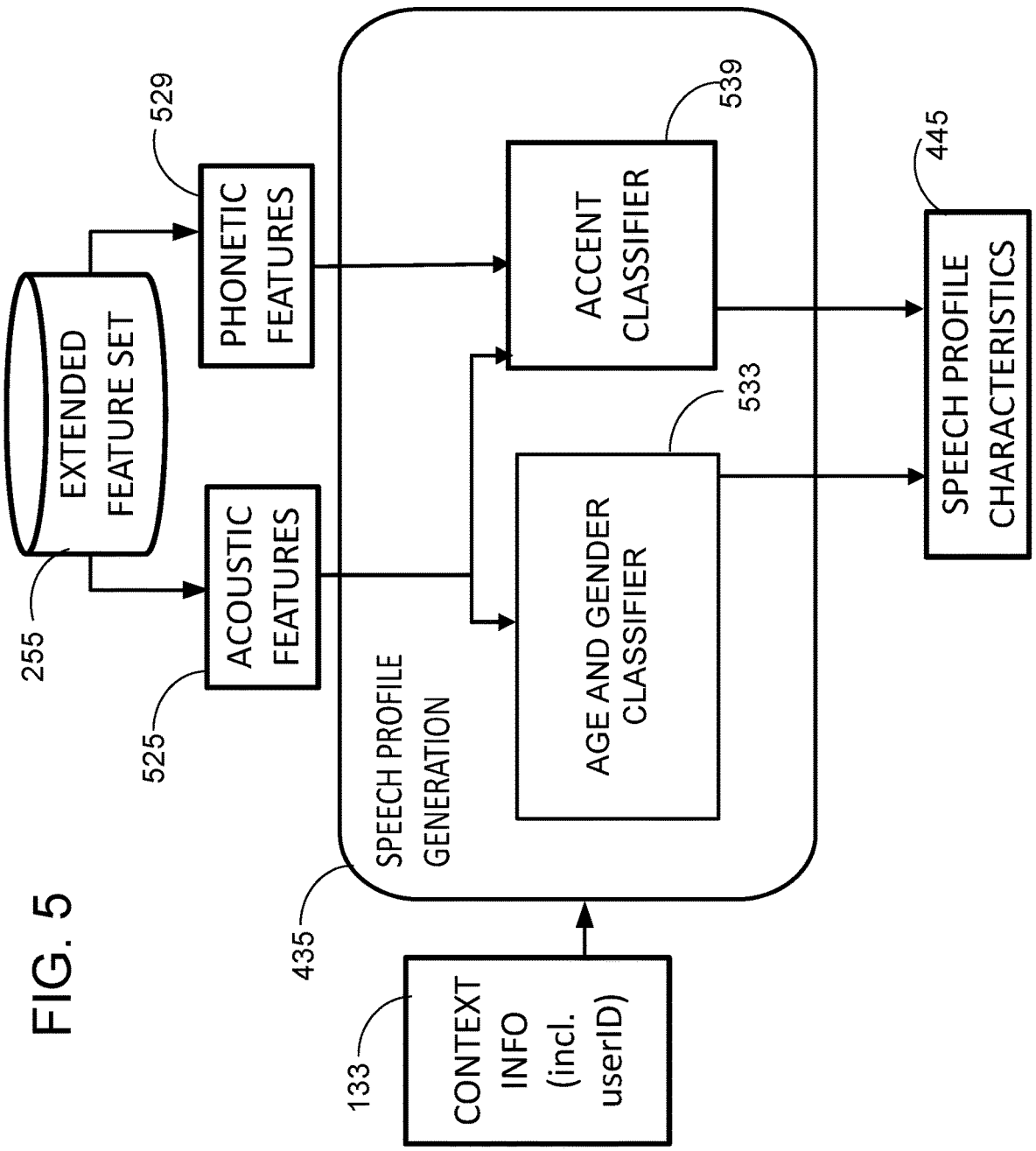
FIG. 5 is a block diagram that illustrates speech-based classification and profile generation, according to an implementation of the invention.

The speech profile generation module 435 is explored in more detail in FIG. 5. FIG. 5 illustrates speech-based classification and profile generation, according to an implementation of the invention. In FIG. 5, the acoustic and phonetic features 425 of FIG. 4 are split into separate acoustic features 525 and phonetic features 529. The speech profile generation module 435 includes a combined age and gender classifier 533 using acoustic features 525 as input, and an accent classifier 539 using phonetic features 529 as well as acoustic features 525 as inputs. These classifiers produce speech profile characteristics 445 for integration into the user profile 147.

Accent Classification

It is possible to recognize the accent of a foreign or native speaker from samples of a user's speech, and to add a value to an accent property to the user's profile 275. In one exemplary implementation, the values for the accent property for English may include Native English and Non-Native English. Subcategories of Native English include Australian English, British English, Scottish English, and Southern American, and subcategories of Non-Native English include an Indian-Subcontinent accent, a Chinese accent, a French accent, and others. In some implementations, certain subcategories could be further divided. For example, the Indian-Subcontinent accent can be derived from the Tamil accent and Kannada accent.

The accent classifier 539 can employ a variety of classification techniques, such as the Naïve Bayesian Classifier, Hidden Markov Model (HMM), Support Vector Machine (SVM), or Deep Neural Networks (DNN), to classify the user accent based on prosodic features including stress, intonation, and rhythm including pauses derived from primary acoustic features. One can also use model combination techniques such as Bayesian Model Averaging, or other ensemble techniques, to improve the accent detection accuracy. These classifiers may be adapted on a continuous basis, based on new data.

An accent classifier may use many features for identifying and classifying an accent. Articulatory, prosodic, and phonetic factors may all play a role in analyzing utterances to identify accents. Language skills developed by pre-pubescent children include a speaking style (involving the features of phoneme production, articulation, tongue movement, or other vocal tract physiological phenomena) that governs accent as well. Normal speech production includes a sequence of movements in the vocal tract. These movements are different accounting for different accents. A person with a foreign accent can be said to exhibit deviations in speech articulation. A modified articulation model, based on parameters such as the place and manner of articulation, can be used to model the articulation deviations of accents. We may use deviations in neutral versus accented word production as distinctive features for accent classification, including but not limited to: front vowel position; central vowel position; back vowel position; bilabial position; labiodental position; dental position; alveolar position; velar position; glottal position; and first and second order deviation of articulation positions.

Patterns of intonation, as well as lexical stress and rhythm, are prosodic features of speech production. Speakers with accents differ from native speakers in their continuative intonations. Other acoustic and prosodic features to model the change in speech production due to accent, including autocorrelation lags; log area ratios; line spectral pair frequencies; fundamental frequency; formant location and bandwidth; short-time energy of the speech signals; slope of continuative intonations; mean and standard deviation of the syllable rate; mean and standard deviation of the syllable rate of the speakers; and pause duration between the syllables.

Extraction of any and all of these features that contribute to accent classification can be derived from the acoustic features 327 and phonetic features 337 that make up extracted feature set 257. Associations between such features and various national or regional accents can be used to build a classifier, as set out in, for example, Ghinwa Choueiter, Geoffrey Zweig, and Patrick Nguyen, 2008, "An Empirical Study of Automatic Accent Classification," In Proc. ICASSP'08, Vol. 1, pp. 4265-4268, to map a user's features to an accent characteristic. For example, statistics concerning the phonetic realization of words are correlated to accents. This fact can be exploited by machine learning models. Additional techniques may be used to improve accent classification, for example, Gaussian Tokenization, or discriminative training with a Maximum Mutual Information criterion could be applied. Finally, ensemble classifier methods can then help create a stronger classifier from many independent ones.

Age and Gender Classification

Age and Gender properties are closely related in terms of acoustic expression. As a result, the illustrated implementation employs a single age and gender classifier 533 to perform both age and gender classification. Alternate approaches using separate, independent classifiers may be adopted.

A number of acoustic features can help identify the characterization of age and gender. For example, speaker articulation differences, vocal tract differences, and vocal fold differences together may indicate a particular user's age and gender. A number of suitable designs for classifying age and gender based on speech are available in the art. In one example, a machine learning model, such as a Deep Neural Network (DNN), can capture the underlying mapping between acoustic features, such as MFCC, and internal articulation parameters, such as articulator position, manner of articulation, etc. The derived articulation features may be used as input to train age, gender and accent classifiers. A number of similar approaches have been proposed. These include the use of a Gaussian Mixture Model based on MFCC, a Support Vector Machine based on GMM mean supervectors, or an SVM. Acoustic features useful for gender and age classification include (1) the vocal tract features derived from MFCC coefficients; (2) the modulation cepstrum, in which slow- and fast-varying factors can be selected to extract relevant spectral features of different speakers; (3) the pitch or the fundamental frequency, including mean and standard deviation, and corresponding statistics of the slope of the extracted pitch contour; (4) the harmonics-to-noise ratio; and (5) the magnitude of spectral peaks in each frame, as detected in a short-time Fourier analysis of the input signal.

Prosodic features also apply to age and gender classification. Physiological studies show that the speech generation process is affected by age in many ways. For instance, the vocal tract length is increased by a lowered glottis position; and pulmonary function may be reduced, together with stiffer vocal folds. Prosodic features found useful for age and gender classification include the following: (1) short-time energy and its first and second order statistics; (2) duration features on the phoneme level (a measurement of how much faster or slower a phoneme is spoken by a user, compared to its mean duration); and (3) duration features on the word level (the measurement of how much faster or slower the word in a given interval was spoken as compared to their mean, user-specific word rate).

The age and gender classifier 533 also recognizes the possibility that user context information 133 may already contain age and gender information, in which case that information may be fed through to the speech profile characteristics 445 and needs no classification step. The following discussion addresses the case where age and gender are not given in context information 133.

Age and gender may be classified based on acoustic features 525 in the extended feature set 255 (derived and accumulated from primary acoustic features 327): either by classifying age independently from classifying gender or by classifying age and gender inter-dependently. In other words, there may be cross-property value constraints for the age and gender properties. The gender property may have a value of Male (M) or Female (F), and the age property value may be expressed using the following categories:

Child: 0-13 years (C);
Young adult: 14-18 years (Y);
Adult: 19-64 years (A);
Senior: >=65 years (S)

Alternatively, a single profile property may be used for age and gender combined.

For example:
Children: 0-13 years (C);
Young adult, male 14-18 years (YM);
Young adult, female 14-18 years (YF);
Adult male, 19-64 years (AM);
Adult female, 19-64 years (AF);
Senior male: >=65 years (SM);
Senior female: >=65 years (SM)

It is difficult to identify the gender of children, so a value of a combined Age-Gender profile property may only indicate a child without an indication of gender.

In an alternative implementation, the age and gender profile properties could be classified in an application-specific manner, or could change based on improvements in classification algorithms, availability of more data, or both. For example, the adult age categories could be further subdivided.

Language Profile Generation

Figure 6:
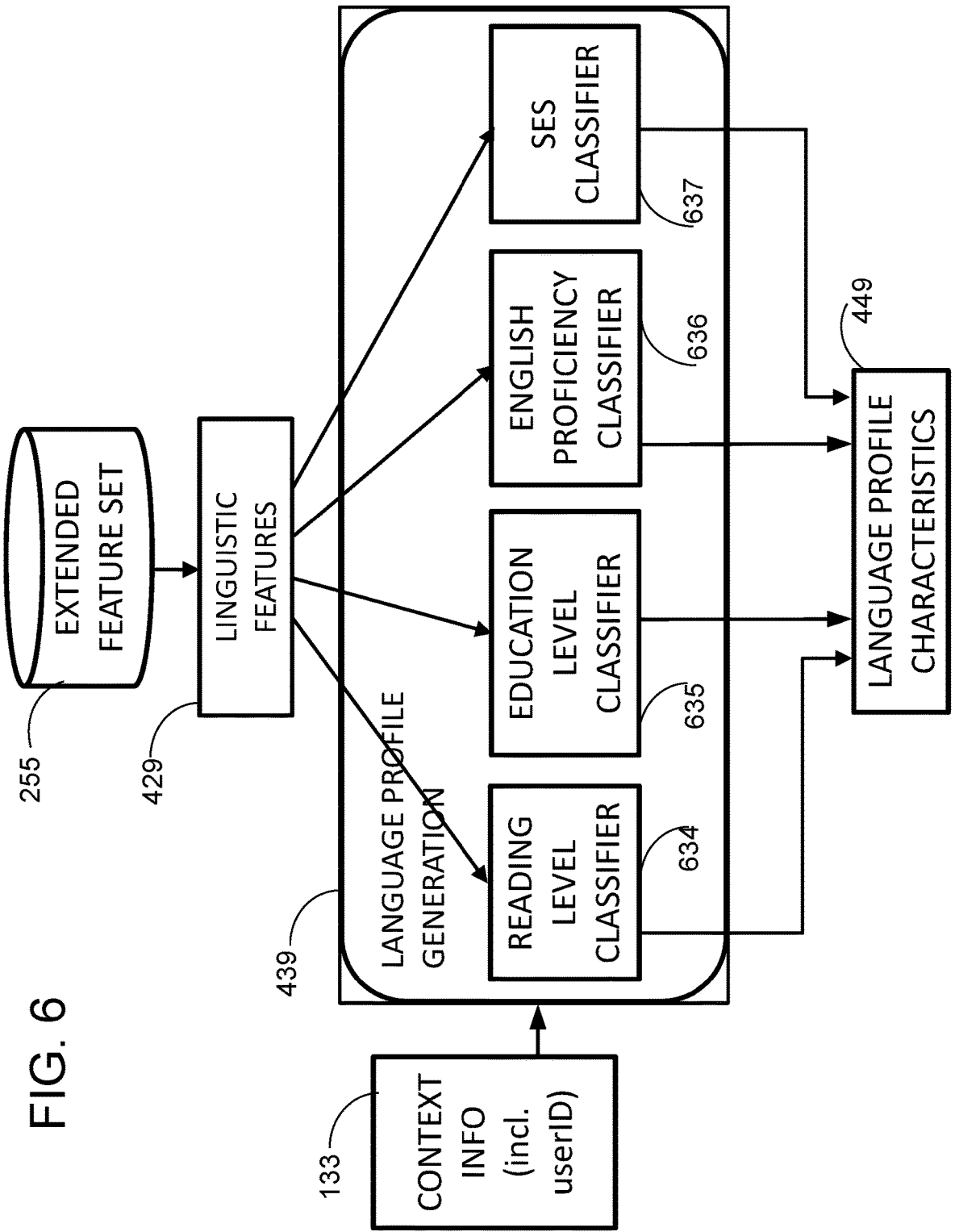
FIG. 6 is a block diagram that illustrates language-based classification and profile generation, according to an implementation of the invention.

The language profile generation module 439 is explored in more detail in FIG. 6. FIG. 6 illustrates language-based classification and profile generation, according to an implementation of the invention. The computations used to classify linguistic features 429 are much simpler than for classifying acoustic and phonetic features. Language-based features may be syntactic, represented by text, and text processing is not as computationally expensive as audio processing algorithms. The system uses language profile generation module 439 to generate language profile characteristics 449. Language profile generation 439 receives input from linguistic features 429 of the extended feature set 255, particularly those derived or accumulated from textual features 347 and linguistic features 357 (FIG. 3). Specific features may include average sentence length, and average word complexity—as measured by their length, lookups in stored tables of word complexity, and/or a simple function of the word's rank in a frequency-ordered dictionary.

Several formulas exist that can power a reading level classifier 634, education level classifier 635, and English proficiency classifier 636. In some English speaking countries or regions, there is a strong correlation between speech patterns and socio-economic status (SES). In one implementation, information from reading level, education level and English proficiency classifiers, as well as semantic features, may be used as input to a SES classifier 637. A reading level classifier 634 generates a numeric value derived from analyzing a body of text, which approximates the minimum American grade-level education that one would need to understand the text. Many such formulas have been developed, including "Flesh-Kincaid Grade Level", "Dale-Chill Formula", and "Fry Readability Graph". These tools generally infer a readability rating of some given text based on its mean sentence length, mean syllables per word, and whether the words it contains are classified as "easy" or "hard". In a typical implementation of this system, language classifiers may be based on one or more of these formulas to estimate the readability rating of user utterances. The value can be interpreted as an American school grade level (such as the value 8.0 for grade 8), or it can be used to estimate directly the attained education level of the user. Hence, reading level and education level may have similar values, and in one implementation, the reading level classifier 634 and education level classifier 635 may be one and the same or otherwise grouped together.

An estimation of likely educational level can in turn be used to make statistical inferences about a user's age, based on the likely age of a person with that education level. In some instances, if the actual age of the user is otherwise known, through the context information 133 or from the speech-based profile characteristics 445, any disparity between the readability of the user's input and his age can be used to infer other information about the user. For example, a very high readability score relative to the user's age can potentially provide signals that the user has high aptitude. Depending on the system, however, a user may have been deliberately using simple language and short sentences when interacting with the system, leading to an estimate of the user's reading level much lower than the user's true reading level. Thus, design and weighting (e.g., usefulness of the classifier to an advertiser) of the classifiers categorizing a user's education may take into account the anticipated language of the user speech 117 in the speech recognition application 237.

There are several simple formulas that an English language proficiency classifier 636 can apply to user utterances. The percentage of utterances that are grammatically correct could be evaluated by using a parser for a precise English grammar, as opposed to a more forgiving parser. Another method may be to determine the number and variety of unique sentence or phrase structures collected from the user, such as looking for variations in tense, person, and use of prepositional phrases. Yet another method may be to determine the number of unique words uttered by the user. These features are in contrast with the reading level classifier 634, based on formulas traditionally used in the school system. However, depending on the system, a user may deliberately use simple utterances of similar form, in an attempt to ensure that the system will recognize his utterances, based on previous experiences with this or similar systems.

Text-Based Implementation

Figure 7:
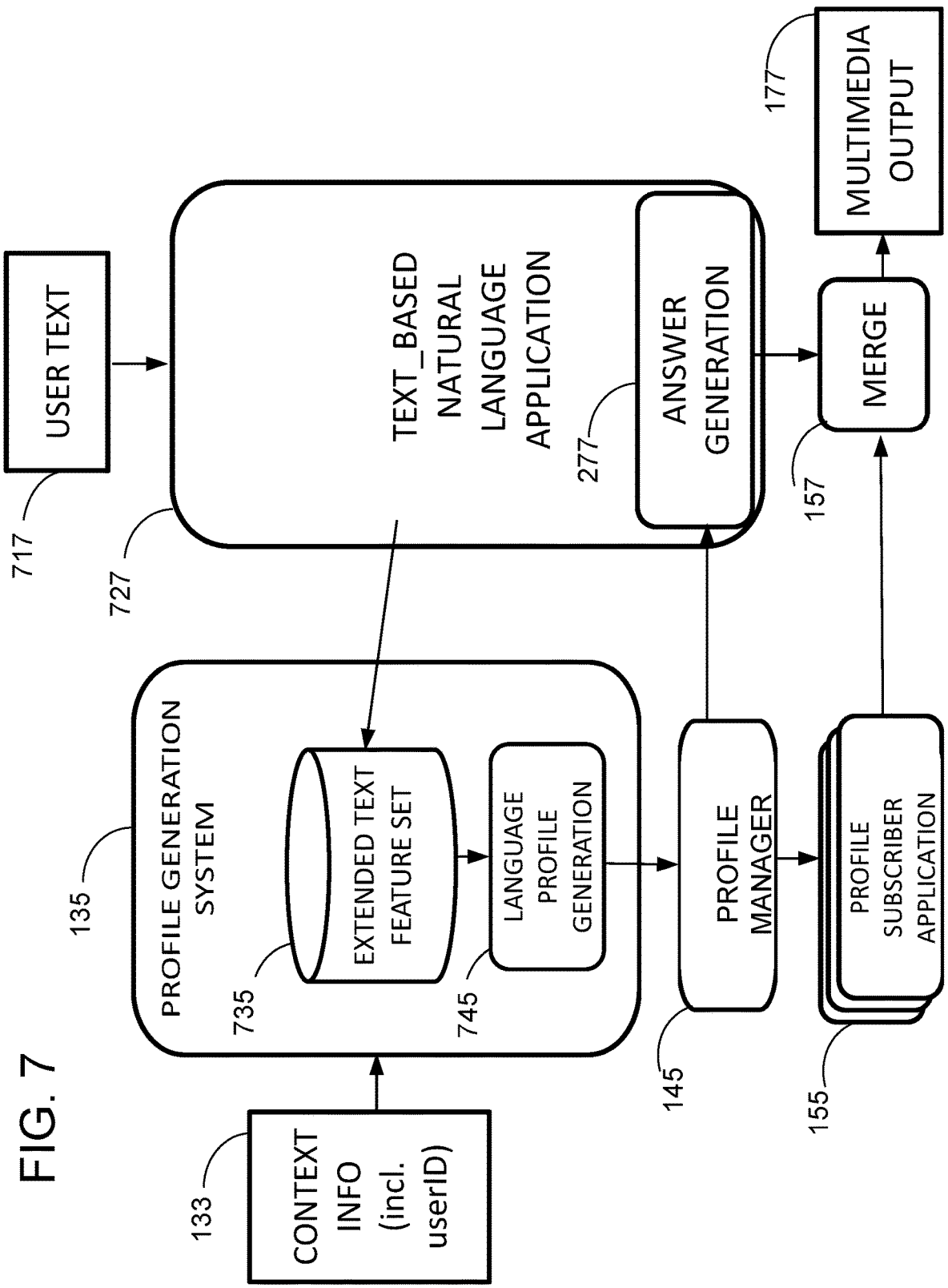
FIG. 7 is a block diagram that illustrates a text-based implementation of the invention.

FIG. 7 illustrates a text-based implementation of the invention. FIG. 7 is similar to FIG. 2, the difference being that FIG. 7 illustrates an implementation for a text-based, rather than a speech-based, natural language application 727. That is, the natural language input is not an utterance but rather a text input 717. The system is similar in structure and function to the implementation illustrated in FIG. 2 but operates with a subset of the information, and with restricted functionality. Nevertheless, properties may be extended in useful ways by a text-based profile generation system 135. With text-only user input 717, the acoustic features 327 and phonetic features 337 are unavailable, and so are any of the extended features derived from acoustic and phonetic features. Hence, extended text feature set 735 is a subset of the previous extended feature set 255. The natural language application 727 may process the textual user input all at once if supplied from a file, or as it is typed in, extracted into a primary feature set, and immediately made available to the profile generation system. The language profile generation module 745 is a subset of the user profile generation module 265. The set of profile properties is similarly reduced in the user profile. For example, a property value may not be determined for accent, and the classification of age and gender may have much less feature data to work with, and thus will be less reliable. Even without having acoustic and phonetic features, age may be inferred using properties of English proficiency, education, and reading level that may be classified based on text-only features. Gender, however, is more difficult to infer based on only textual and linguistic features.

The interaction of the profile manager 145 with profile subscriber application(s) 155, answer generation 277, and multimedia output 177 remain unchanged from the speech-based system in FIG. 2.

Figure 8:
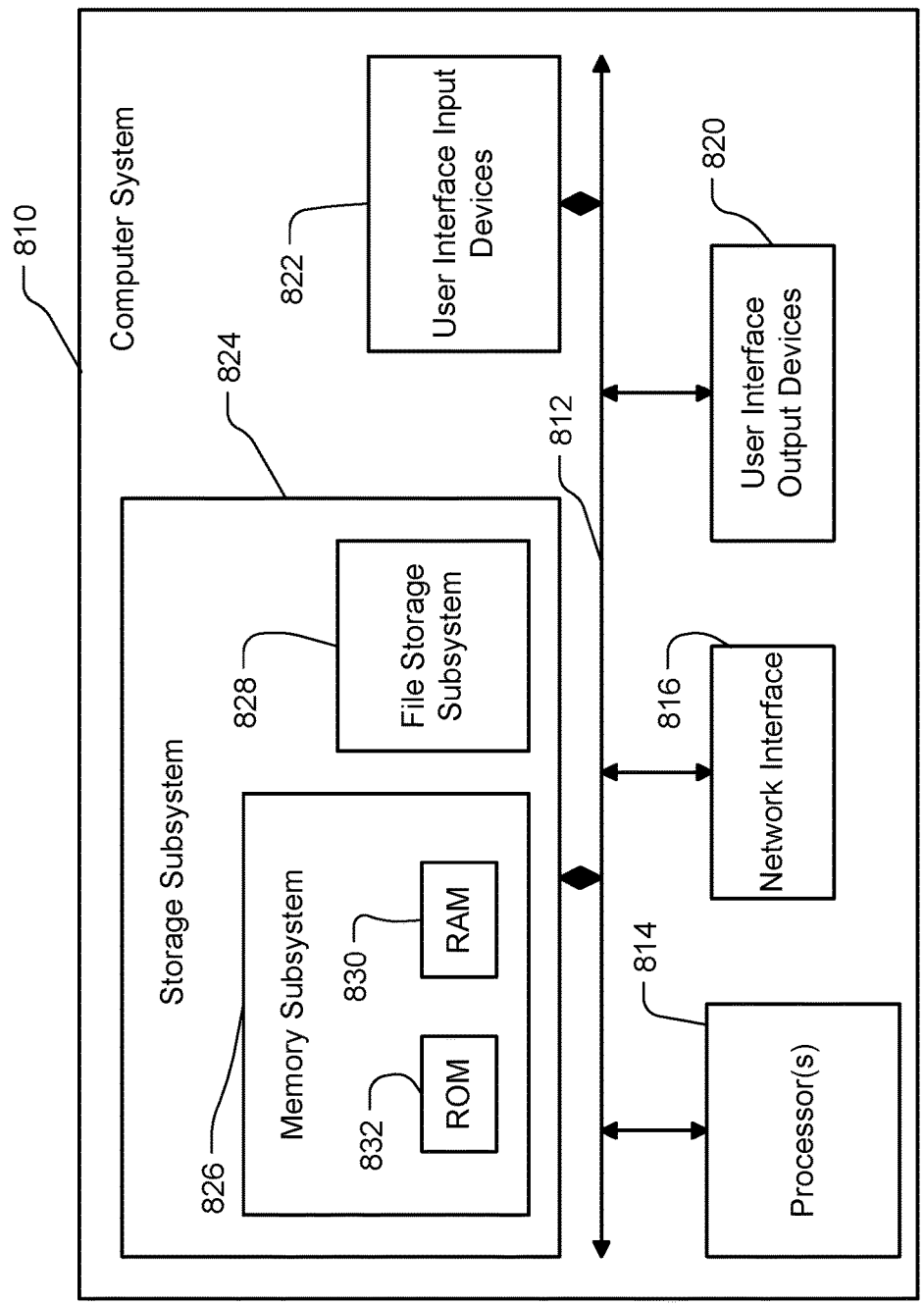
FIG. 8 is a block diagram that depicts a computer system in which the disclosed technology may be implemented.

FIG. 8 is a block diagram that depicts a computer system in which the disclosed technology may be implemented. Computer system 810 typically includes at least one processor 814, which communicates with a number of peripheral devices via bus subsystem 812. These peripheral devices may include a storage subsystem 824, comprising for example memory devices and a file storage subsystem, user interface input devices 822, user interface output devices 820, and a network interface subsystem 816. The input and output devices allow user interaction with computer system 810. Network interface subsystem 816 provides an interface to outside networks, including an interface to communication network 140, and is coupled via communication network 140 to corresponding interface devices in some computer systems.

User interface input devices 822 may include a keyboard, pointing devices such as a mouse, trackball, touchpad, or graphics tablet, a scanner, a touch screen incorporated into the display, audio input devices such as voice recognition systems, microphones, and other types of input devices. In general, use of the term "input device" is intended to include all possible types of devices and ways to input information into computer system 810 or onto communication network 140.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some mechanism for creating a visible image. The display subsystem may also provide non-visual display such as via audio output devices. In general, use of the term "output device" is intended to include all possible types of devices and ways to output information from computer system 810 to the user or to another machine or computer system.

Storage subsystem 824 stores programming and data constructs that provide the functionality of some or all of the modules described herein, including the logic to create inferred queries for use as query suggestions according to the processes described herein. These software modules are generally executed by processor 814 alone or in combination with additional processors.

Memory 826 used in the storage subsystem can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem 828 in the storage subsystem 824, or in additional machines accessible by the processor.

Bus subsystem 812 provides a mechanism for letting the various components and subsystems of computer system 810 communicate with each other as intended. Although bus subsystem 812 is shown schematically as a single bus, some embodiments of the bus subsystem may use multiple busses.

Computer system 810 can be of varying types including a workstation, server, computing cluster, blade server, server farm, or any other data processing system or computing device. Due to the ever-changing nature of computers and networks, the description of computer system 810 depicted in FIG. 8 is intended only as a specific example for purposes of illustrating the preferred embodiments. Many configurations of computer system 810 are possible having more or fewer components than the computer system depicted in FIG. 8.

Some Particular Implementations

In one implementation, a method is described that assigns values to user profile properties based on analyzing user speech. The method includes receiving and storing extracted features representing one or more features of user speech observed over a first time period, deriving and storing derived features based on the received extracted features, and aggregating accumulated features by computing statistics based on extracted features and derived features that are stored during a second time period that is longer than the first time period. Values for one or more user profile properties are assigned based on the accumulated features, derived features, and extracted features. The user profile property values are stored in a user profile.

This method or other implementations of the technology disclosed can each optionally include one or more of the following aspects. Two features extracted within the same time period may be mutually constrained. The extracted features may be received from more than one feature extractor. The extracted features may include multiple of a cepstrum, a spectrogram, and a phoneme lattice. Values may be assigned to user profile properties including age, gender, accent, reading level, education level, English language proficiency, and socio-economic status (SES). A user-supplied value for a user profile property may be used to constrain a value assigned to a different speech-related user profile property.

Other implementations may include a non-transitory computer-readable storage medium storing instructions executable by a processor to perform a method as described above. Yet another implementation includes a system including a non-transitory computer-readable storage medium and a processor operable to execute instructions stored in the non-transitory computer-readable storage medium, to perform a method as described above.

In another implementation, a method is described that determines values of user profile properties based on textual input. The method includes receiving a textual input, creating a parse tree by processing the textual input against a grammar and deriving linguistic features from the parse tree; and mapping the linguistic features to one or more profile property values. Optionally, a linguistic feature is derived that includes an indication of use of grammar or vocabulary.

The speech recognition architecture just described is exemplary; many variants and alternative implementations exist, that a person in the art will recognize.

The specification has described a method and system for generating a detailed user profile through analysis of audio, speech, text, and context inputs. Those of skill in the art will perceive a number of variations possible with the system and method set out above. These and other variations are possible within the scope of the claimed invention, whose scope is defined solely by the claims set out below. The description is made with reference to the figures. Preferred implementations are described to illustrate the disclosure, not to limit its scope, which is defined by the claims. Those of ordinary skill in the art will recognize a number of equivalent variations in the description that follows.

We claim:

1. A computer-implemented method of advertisement selection, the method comprising:
   recognizing, by a processor, words from user speech over multiple interactions;
   computing, by a processor, a number of unique words uttered during the interactions;
   classifying, by a processor, the user by the number of unique words uttered during the interactions;
   selecting, by a processor, an advertisement targeted to the classified user; and
   providing, by a processor, the selected advertisement to the classified user in the form of multimedia,
   wherein the user is classified by assigning an English proficiency score to the user.

2. A computer-implemented method of advertisement selection, the method comprising:
   recognizing, by a processor, words from user speech over multiple interactions;
   computing, by a processor, an average word length of the recognized words;
   classifying, by a processor, the user by the average word length;
   selecting, by a processor, an advertisement targeted to the classified user; and
   providing, by a processor, the selected advertisement to the classified user in the form of multimedia.

3. The computer-implemented method of claim 1, wherein the interactions are multi-session interactions.

4. The computer-implemented method of claim 2, wherein the interactions are multi-session interactions.

5. The computer-implemented method of claim 2, wherein the user is classified according to one or more of age, gender, English proficiency, education level and socio-economic status.

6. The computer-implemented method of claim 2, wherein the user is classified according to two or more of age, gender, English proficiency, education level and socio-economic status.

7. The computer-implemented method of claim 2, wherein the user is classified according to three or more of age, gender, English proficiency, education level and socio-economic status.

8. The computer-implemented method of claim 2, wherein the user is classified according to four or more of age, gender, English proficiency, education level and socio-economic status.

9. The computer-implemented method of claim 2, wherein the user is classified according to each of age, gender, English proficiency, education level and socio-economic status.

10. The computer-implemented method of claim 1, wherein the user is classified according to one or more of age, gender, English proficiency, education level and socio-economic status.

11. The computer-implemented method of claim 1, wherein the user is classified according to two or more of age, gender, English proficiency, education level and socio-economic status.

12. The computer-implemented method of claim 1, wherein the user is classified according to three or more of age, gender, English proficiency, education level and socio-economic status.

13. The computer-implemented method of claim 1, wherein the user is classified according to four or more of age, gender, English proficiency, education level and socio-economic status.

14. The computer-implemented method of claim 1, wherein the user is classified according to each of age, gender, English proficiency, education level and socio-economic status.

* * * * *